(12) United States Patent
Knoener

(10) Patent No.: US 10,773,328 B2
(45) Date of Patent: Sep. 15, 2020

(54) WELDING SYSTEM USER INTERFACE HAVING A COLOR DISPLAY FOR SETTING WELDING PARAMETERS

(71) Applicant: ILLINOIS TOOL WORKS INC., Glenview, IL (US)

(72) Inventor: Craig Steven Knoener, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 586 days.

(21) Appl. No.: 15/362,355

(22) Filed: Nov. 28, 2016

(65) Prior Publication Data

US 2017/0165775 A1 Jun. 15, 2017

Related U.S. Application Data

(60) Provisional application No. 62/267,720, filed on Dec. 15, 2015.

(51) Int. Cl.
*B23K 9/10* (2006.01)
*B23K 9/095* (2006.01)
*G06F 3/0484* (2013.01)

(52) U.S. Cl.
CPC ............ *B23K 9/095* (2013.01); *B23K 9/0953* (2013.01); *B23K 9/1006* (2013.01); *G06F 3/04847* (2013.01)

(58) Field of Classification Search
CPC .............................. B23K 9/0953; B23K 9/095
See application file for complete search history.

(56) References Cited

U.S. PATENT DOCUMENTS 2,424,324 A 7/1947 Murcek
3,125,671 A 3/1964 Manz
(Continued)

FOREIGN PATENT DOCUMENTS

CN 1539588 10/2004
CN 1646252 7/2005
(Continued)

OTHER PUBLICATIONS

Canadian Office Action Appln No. 3,006,557 dated Mar. 15, 2019.
(Continued)

*Primary Examiner* — Dana Ross
*Assistant Examiner* — Lawrence H Samuels
(74) *Attorney, Agent, or Firm* — McAndrews, Held & Malloy, Ltd.

(57) ABSTRACT

In certain embodiments, a welding system includes an interface with a first input element configured to receive an input relating to a parameter of power delivered to a welding torch from a welding power supply, a second input element configured to receive an input relating to a rate of advancement of an electrode delivered to the welding torch from a welding wire feeder, a third input element configured to receive an input relating to whether the parameter of power and the rate of advancement of the electrode are automatically set, and a color display device configured to display the parameter of power and the rate of advancement of the electrode. The welding system also includes control circuitry configured to adjust and display on the color display device the parameter of power and the rate of advancement based at least in part on a selected diameter setting for the electrode and a selected material thickness setting for a work piece when the third input element is activated, and to control the parameter of power and the rate of advancement (Continued)

based on the adjustment of the parameter of power and the rate of advancement.

24 Claims, 19 Drawing Sheets

(56) References Cited

U.S. PATENT DOCUMENTS

| | | | |
|---|---|---|---|
| 3,555,239 | A | 1/1971 | Kerth |
| 3,924,094 | A | 12/1975 | Hansen |
| 4,093,844 | A | 6/1978 | Fellure |
| 4,438,317 | A | 3/1984 | Ueguri |
| 4,510,373 | A | 4/1985 | Cox |
| 4,608,482 | A | 8/1986 | Cox |
| 4,721,947 | A | 1/1988 | Brown |
| 4,973,821 | A | 11/1990 | Martin |
| 5,043,554 | A | 8/1991 | Kohsaka |
| 5,278,390 | A | 1/1994 | Blankenship |
| 5,571,431 | A * | 11/1996 | Lantieri .......... B23K 9/0953 219/130.01 |
| 5,643,479 | A | 7/1997 | Lloyd |
| 6,091,048 | A | 7/2000 | Lanouette |
| 6,096,994 | A | 8/2000 | Handa |
| 6,166,350 | A | 12/2000 | Sickels |
| 6,167,328 | A | 12/2000 | Takaoka |
| 6,476,354 | B1 | 11/2002 | Jank |
| 6,583,386 | B1 | 6/2003 | Ivkovich |
| 6,649,870 | B1 | 11/2003 | Barton |
| 6,735,540 | B2 | 5/2004 | Pedrazzini |
| 6,744,011 | B1 | 6/2004 | Hu |
| 6,930,280 | B2 * | 8/2005 | Zauner .......... B23K 9/0953 219/130.5 |
| 8,546,728 | B2 | 10/2013 | Sickels |
| 8,604,389 | B2 | 12/2013 | Stanzel |
| 8,766,132 | B2 | 7/2014 | Blankenship |
| 8,952,292 | B2 | 2/2015 | Behmlander |
| 9,802,265 | B2 | 10/2017 | Sickels |
| 2001/0047987 | A1 | 12/2001 | Nowak |
| 2004/0004064 | A1 | 1/2004 | Lanouette |
| 2004/0020911 | A1 | 2/2004 | Centner |
| 2004/0095704 | A1 | 5/2004 | Cigelske |
| 2004/0099648 | A1 | 5/2004 | Hu |
| 2004/0129759 | A1 | 7/2004 | Rouault |
| 2004/0173591 | A1 | 9/2004 | Knoener |
| 2004/0226930 | A1 | 11/2004 | Radtke |
| 2005/0000946 | A1 | 1/2005 | Albrecht |
| 2005/0016979 | A1 | 1/2005 | Stein |
| 2005/0045608 | A1 | 3/2005 | Sykes |
| 2005/0045611 | A1 | 3/2005 | Ihde |
| 2005/0161448 | A1 | 7/2005 | Stava |
| 2005/0173393 | A1 | 8/2005 | Nowak |
| 2007/0155347 | A1 | 7/2007 | Heuermann |
| 2007/0181553 | A1 * | 8/2007 | Stanzel .......... B23K 9/0953 219/137.71 |
| 2008/0203065 | A1 | 8/2008 | Feldhausen |
| 2008/0208387 | A1 | 8/2008 | DiVenere |
| 2009/0071949 | A1 | 3/2009 | Harris |
| 2009/0152251 | A1 | 6/2009 | Dantinne |
| 2009/0173726 | A1 | 7/2009 | Davidson |
| 2009/0277893 | A1 * | 11/2009 | Speilman .......... B23K 9/095 219/137.71 |
| 2010/0314370 | A1 | 12/2010 | Granato |
| 2011/0049116 | A1 | 3/2011 | Rappl |
| 2012/0189993 | A1 * | 7/2012 | Kindig .......... G09B 19/24 434/234 |
| 2012/0241429 | A1 * | 9/2012 | Knoener .......... B23K 9/095 219/130.01 |
| 2013/0092672 | A1 * | 4/2013 | Peters .......... B23K 9/0953 219/130.31 |
| 2014/0263225 | A1 * | 9/2014 | Daniel .......... B23K 9/0953 219/125.1 |
| 2016/0039034 | A1 * | 2/2016 | Becker .......... A61F 9/06 219/137 R |
| 2017/0036288 | A1 | 2/2017 | Albrecht |

FOREIGN PATENT DOCUMENTS

| | | |
|---|---|---|
| CN | 102378666 | 3/2012 |
| CN | 103071891 | 5/2013 |
| CN | 104203475 | 12/2014 |
| DE | 4112985 | 10/1992 |
| DE | 9301390 | 4/1993 |
| DE | 19733638 | 2/1999 |
| EP | 0901865 | 3/1999 |
| EP | 0987079 | 3/2000 |
| EP | 1445055 | 8/2004 |
| EP | 1512480 | 3/2005 |
| EP | 1559496 | 8/2005 |
| FR | 2836641 | 9/2003 |
| JP | S5719185 | 2/1982 |
| WO | 0112376 | 2/2001 |
| WO | 2010142858 A1 | 12/2010 |

OTHER PUBLICATIONS

Canadian Office Action appln. No. 2,830,995 dated Nov. 2, 2017 (4 pages).
Canadian Office Action Appln No. 3,006,557 dated Feb. 11, 2020 (4 pgs).
Int'l Search Report Appln No. PCT/US2016/066330 dated Sep. 5, 2017 (4 pgs).
Int'l Preliminary Report on Patentability Appln No. PCT/US2016/066330 dated Jun. 28, 2018 (9 pgs).

* cited by examiner

WELDING SYSTEM USER INTERFACE HAVING A COLOR DISPLAY FOR SETTING WELDING PARAMETERS

CROSS-REFERENCE TO RELATED APPLICATION

This application claims priority to and the benefit of U.S. Provisional Application Ser. No. 62/267,720, entitled "WELDING SYSTEM USER INTERFACE HAVING A COLOR DISPLAY FOR SETTING WELDING PARAMETERS", filed Dec. 15, 2015, which is hereby incorporated by reference in its entirety for all purposes.

BACKGROUND

The present disclosure generally relates to systems and methods for setting welding parameters.

A common metal welding technique employs the heat generated by electrical arcing to transition a work piece to a molten state, to facilitate a welding process. One technique that employs this arcing principle is wire feed welding. At its essence, wire feed welding involves routing welding current from a power source into an electrode that is brought into close proximity with the work piece. When close enough, current arcs from the electrode to the work piece, completing a circuit and generating sufficient heat to weld the work piece. Often, the electrode is consumed and becomes part of the weld itself. Thus, new wire electrode is advanced, replacing the consumed electrode and maintaining the welding arc. If the welding device is properly adjusted, the wire feed advancement and arcing cycle progresses smoothly, providing a good weld.

Traditionally, during a welding operation, an operator selects the level and types of resources provided to the weld location, depending, of course, on the particulars of the weld and the materials being welded. For instance, an operator may select between various kinds and sizes of wire electrode, ranging from the diameter of wire to the material the wire electrode is made of. Different kinds of wire electrode, however, perform well at different operational settings of the welding device. That is, different kinds of wire electrodes perform well within different voltage range of values and wire feed speeds, for instance. For example, a given 0.023 inch mild-steel wire electrode may perform well at 17 volts and with a wire feed speed of 250 inches per minute, while a 0.035 inch mild steel wire electrode performs well at 19 volts with a wire feed speed of 230 inches per minute.

Conventionally, welding devices rely on the knowledge and acumen of the operator to select the most appropriate voltage and wire feed settings for the wire electrode being used and weld conditions. Unfortunately, in many cases, the weld operator is a novice to the field, especially in the case of portable welding devices. If the operator does not properly adjust the voltage and wire feed speed settings, the arcing may not be sufficient to produce a good weld, or any weld at all. Furthermore, in traditional devices, the wire feed speed control and the voltage control are wholly independent from one another, thus making it difficult for the operator to adjust both parameters while a weld is progressing.

BRIEF DESCRIPTION

In one embodiment, a welding system includes an interface. The interface includes a first input element configured to receive an input relating to a parameter of power delivered to a welding torch from a welding power supply. The interface also includes a second input element configured to receive an input relating to a rate of advancement of an electrode delivered to the welding torch from a welding wire feeder. The interface further includes a third input element configured to receive an input relating to whether the parameter of power and the rate of advancement of the electrode are automatically set. The interface also includes a color display device configured to display the parameter of power and the rate of advancement of the electrode. The welding system also includes control circuitry configured to adjust and display on the color display device the parameter of power and the rate of advancement based at least in part on a selected diameter setting for the electrode and a selected material thickness setting for a work piece when the third input element is activated, and to control the parameter of power and the rate of advancement based on the adjustment of the parameter of power and the rate of advancement.

In another embodiment, a welding system includes an interface. The interface includes a first input element configured to receive an input relating to a parameter of power delivered to a welding torch from a welding power supply. The interface also includes a second input element configured to receive an input relating to a rate of advancement of an electrode delivered to the welding torch from a welding wire feeder. The interface further includes a third input element configured to receive an input relating to whether the parameter of power and the rate of advancement of the electrode are automatically set. The interface also includes a color display device configured to display a first color graphical representation of an acceptable range of values for the parameter of power, and to display a second color graphical representation of an acceptable range of values for the rate of advancement of the electrode. The welding system also includes control circuitry configured to adjust and display on the color display device the first color graphical representation of the acceptable range of values for the parameter of power when the third input element is activated, to adjust and display on the color display device the second color graphical representation of the acceptable range of values for the rate of advancement of the electrode when the third input element is activated, and to control the parameter of power and the rate of advancement based on the adjustment.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
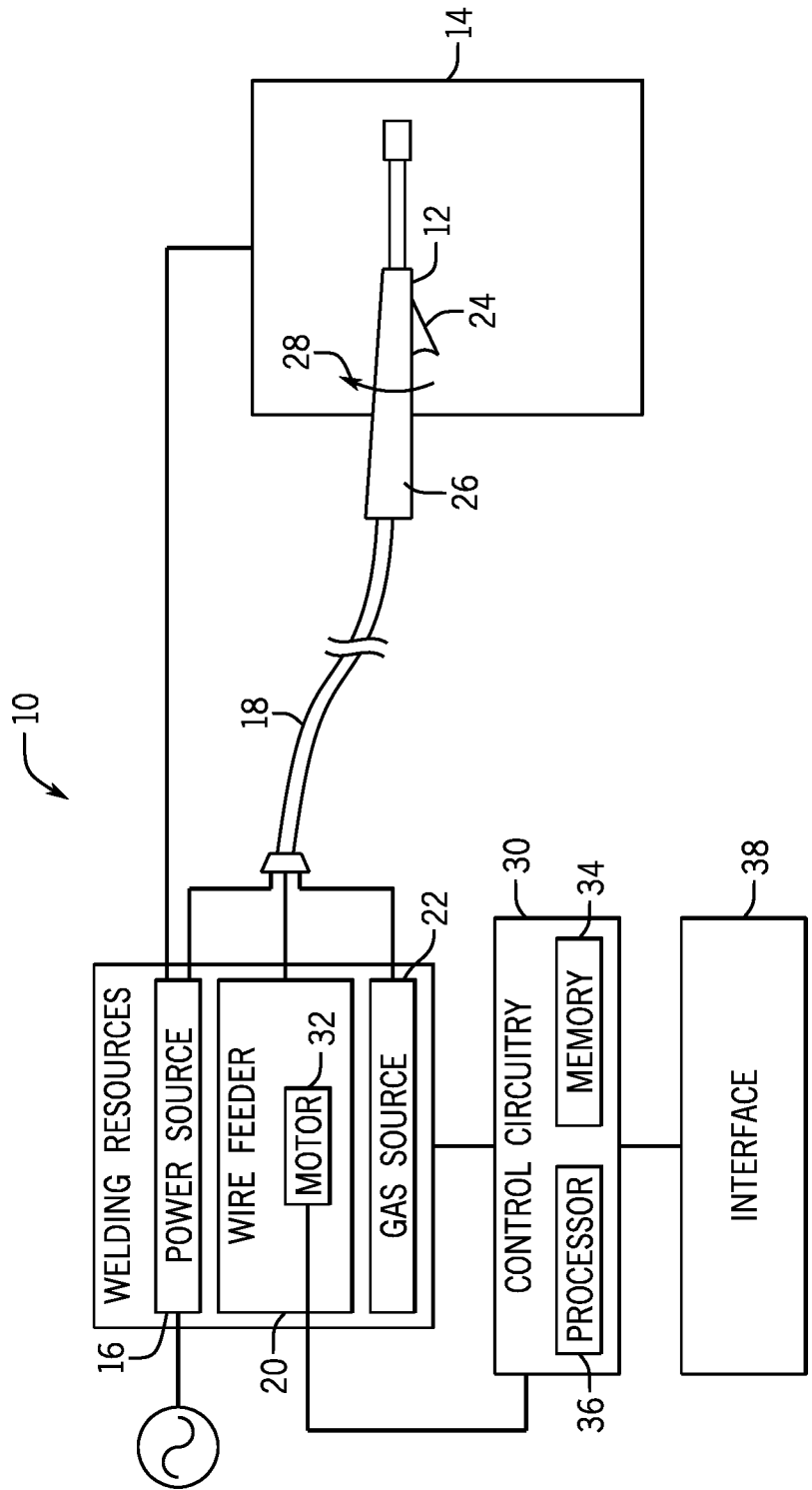
FIG. 1 is a schematic diagram of an embodiment of a welding system, wherein an interface is configured to display welding parameters of the welding system.

Turning now to the figures, FIG. 1 illustrates a welding system 10 that includes a welding torch 12 that defines the location of a welding operation with respect to a work piece 14. Placement of the welding torch 12 at a location proximate to the work piece 14 allows electrical current provided by a power source 16, which converts incoming alternating current (AC) power to an appropriate direct current (DC) power-that is routed to the welding torch 12 via a welding torch cable 18, to arc from the welding torch 12 to the work piece 14. In summary, this arcing completes an electrical circuit from the power source 16, to the welding torch 12 via the welding torch cable 18, to an electrode, to the work piece 14, and at its conclusion, back to the power source 16. This arcing generates a relatively large amount of heat causing the work piece 14 and/or filler metal to transition to a molten state, facilitating creation of a weld.

To produce electrical arcing, the exemplary welding system 10 includes a wire feeder 20 that provides a consumable wire electrode to the welding torch cable 18 and, in turn, to the welding torch 12. The welding torch 12 conducts electrical current to the wire electrode via a contact tip (not shown) located in a neck assembly of the welding torch 12, leading to arcing between the egressing wire electrode and the work piece 14.

To shield the weld area from contaminants during welding, to enhance arc performance, and to improve the resulting weld, in certain embodiments, the exemplary welding system 10 includes a gas source 22 that feeds an inert shielding gas to the welding torch 12 via the welding torch cable 18. It is worth noting, however, that a variety of shielding materials, including various fluids and particulate solids, may be employed to protect the weld location. Additionally, certain wire electrodes are designed to operate without a shielding material.

Advancement of these welding resources (e.g., welding current, wire electrode, and shielding gas) is effectuated by actuation of a trigger 24 secured to a handle 26 of the welding torch 12. By depressing the trigger 24 (arrow 28), a switch disposed within the trigger 24 is closed, causing the transmission of an electrical signal that commands promotion of the welding resources into the welding torch cable 18. For example, depressing the trigger 24 sends a signal to control circuitry 30, which, in turn, activates a motor 32 that advances wire electrode into the welding torch cable 18, opens a valve to allow the flow of shielding material, and commands the power source 16 to output the desired level of power to the wire electrode. In certain embodiments, the control circuitry 30 includes memory components 34, to store programming instructions, command programs, appropriate data, etc. In certain embodiments, the control circuitry 30 also includes a processing device, such as a processor 36, among others types of processing devices, to effectuate control of the welding system 10. In general, the control circuitry 30 is configured to control the operating parameters (e.g., parameters of power, such as voltage and current, delivered by the power source 16, the rate of advancement (e.g., wire feed speed) of the consumable wire electrode via the wire feeder 20, the flow of shielding materials from the gas source 22, and so forth) based on settings received via a user interface 38 that is included as part of the welding system 10, as well as automatic adjustments made to these received settings by the control circuitry as disclosed herein.

The user interface 38 is the primary means by which a user or an operator interacts with the welding system 10. The user interface 38 may include input devices such as a keypad, stylus, pushbuttons, dials, or any form of transducer that converts a physical interaction with the user interface 38 into an electrical signal input. However, as described herein, in certain embodiments, the user interface 38 may also include a color display screen to display color graphical representations of input and output devices such as buttons, icons, text, windows, and similar features relating to the setting and displaying of welding parameters. For example, the user interface 38 may be a graphical interface, and may display color graphical indicators of welding parameters such as voltage, amperage, and wire feed speed in varying colors. In addition, instead of (or in addition to) physical input devices for receiving inputs from a user, in certain embodiments, the color display screen described herein may display user input elements, such as buttons, sliders, knobs, and so forth, for receiving inputs from the user.

As will be discussed henceforth and illustrated by FIGS. 2-19, in certain embodiments, the user interface 38 may include a welding process selector 40, an electrode diameter adjustor 42, a material thickness adjustor 44, an Auto-Set selector 46, a color display screen 48, and voltage and wire feed speed and/or amperage adjust dials 50 and 52, respectively. For further purpose of illustration, FIG. 2 will be referenced in the discussion of the aforementioned components of the user interface 38, although it should be appreciated that FIGS. 3-19 may embody the same components, features, characteristics, properties, and so forth.

Figure 2:
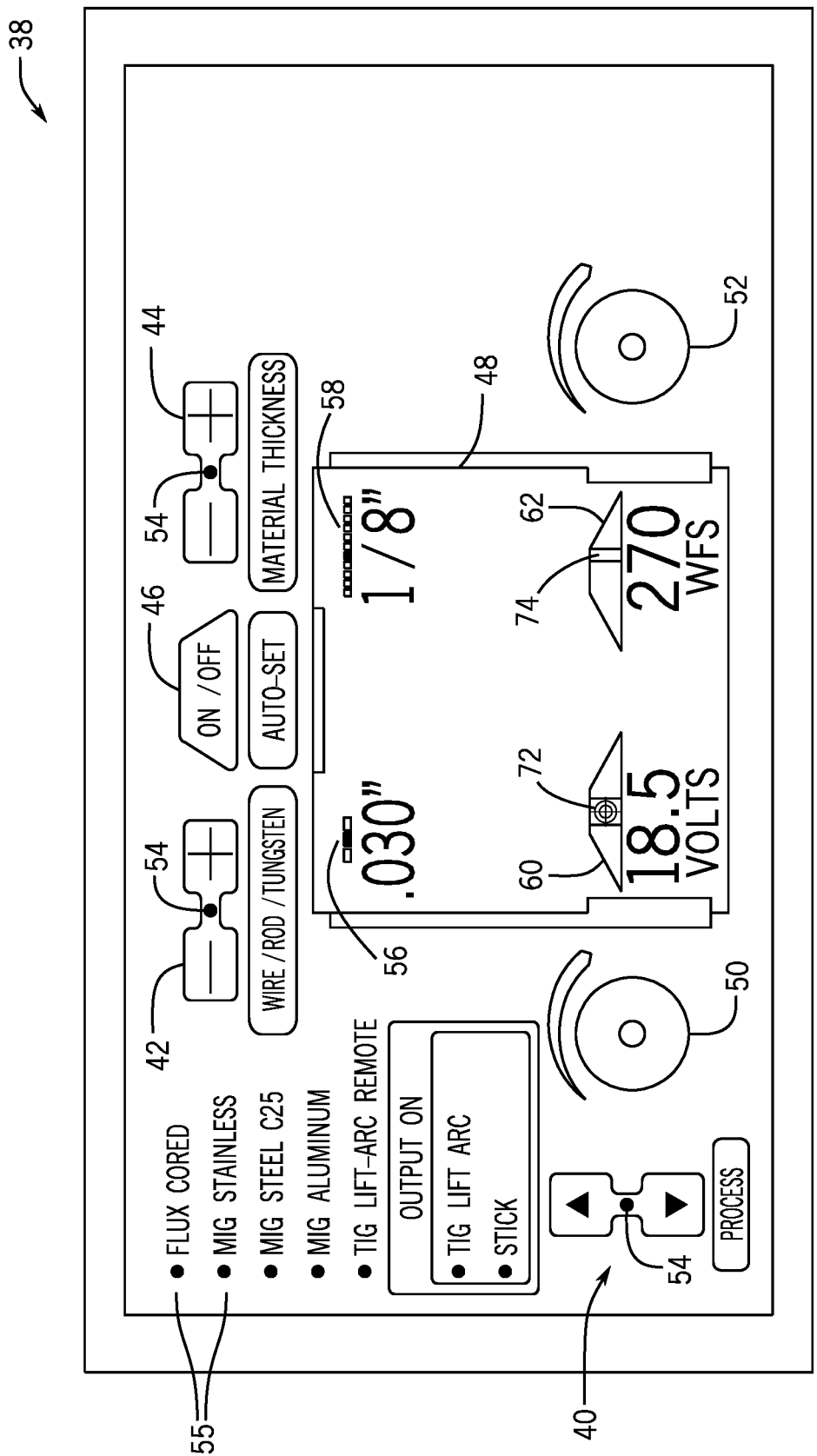
FIG. 2 is a front view of an embodiment of the interface for a MIG or flux cored welding process including Auto-Set welding parameters.

With the foregoing in mind, the welding process selector 40 may allow an operator or other user to select from a plurality of welding processes. For example, as depicted in FIG. 2, the welding process selector 40 may allow an operator to choose from welding processes, such as a stick welding process, a flux cored welding process, one or more metal inert gas (MIG) welding processes, one or more tungsten inert gas (TIG) welding processes, and so forth. In addition to general welding processes, in certain embodiments, the welding process selector 40 may also allow the operator to select the material of the welding electrode. For example, as depicted in FIG. 2, in desiring to implement a MIG welding process, the operator may further select, for example, a stainless steel, another type of steel, or aluminum electrode for implementing the MIG process. In one embodiment, the welding process selector 40 may also allow an operator to select a desired welding process (e.g., stick, MIG, TIG, etc.), electrode material type (e.g., steel, aluminum, etc.), and gas type (e.g., C25, C100, Argon, etc.), and subsequently elect to enable the Auto-Set function of the welding system 10 to automatically set the appropriate voltage and wire feed speed and/or amperage welding parameters. Certain Auto-Set functionality is described in greater detail in U.S. Pat. No. 8,604,389, which is herein incorporated by reference in its entirety.

As previously discussed, the user interface 38 may also include an electrode diameter adjustor 42 (e.g., an electrode wire, an electrode rod, or tungsten electrode, depending on the type of welding process type selected). The electrode diameter is an important parameter in performing welds, as the suitable generated amperage of the welding arc is dependent upon the diameter of the electrode wire. In certain embodiments, the electrode diameter adjustor 42 may feature, for example, a "+" pushbutton to increase the electrode diameter setting and a "−" pushbutton to decrease the electrode diameter setting as depicted. Similarly, the user interface 38 may also include a material thickness adjustor 44, which may also, for example, include a "+" pushbutton to increase the material thickness setting (e.g., relating to the work piece 14 that is being welded upon) and a "−" pushbutton to decrease the material thickness setting. The electrode diameter and material thickness settings, in conjunction, have an effect on the voltage and amperage (i.e., electrical current) required to perform a given welding procedure. In certain embodiments, an operator or other user may select the Auto-Set function via the Auto-Set selector 46. When the Auto-Set feature is enabled (e.g., activated by the operator), the operator may only be required to input the respective electrode diameter and material thickness settings for the power source 16 to automatically adjust (e.g., increase or decrease) voltage, wire feed speed, and/or amperage parameters to appropriate settings.

The Auto-Set selector 46 may be, for example, an on/off electrical switch or on/off pushbutton, which may be activated or deactivated, allowing an operator to simply enable or disable the Auto-Set function of the welding system 10. In certain embodiments, the user interface 38 may include one or more light indicators 54 (e.g., LEDs in certain embodiments) to indicate whether the Auto-Set function is enabled or disabled. For example, in performing a MIG welding process, the operator may select the Auto-Set function, via the Auto-Set selector 46 and the one or more light indicators 54 may display a blue light, for example, or other indication to the operator that the Auto-Set function is enabled. Similarly, in certain embodiments, the welding process selector 40 may be associated with a plurality of light indicators 55, each light indicator 55 being spatially aligned with a label corresponding to a respective welding process (e.g., "FLUX CORED", "MIG STAINLESS", and so forth) such that manipulation of the welding process selector 40 changes the selected welding process, and the light indicator 55 that corresponds to the selected welding process may display a blue light, for example, or other indication to the operator that the particular welding process has been selected, while the other light indicators 55 corresponding to the other welding processes are not illuminated.

Corresponding to the aforementioned electrode diameter adjustor 42, material thickness adjustor 44, and Auto-Set selector 46, the user interface 38 may include a color display screen 48. The color display screen 48 may be any display device capable of displaying visual graphical objects and/or alphanumeric texts relating to the setting of welding parameters, real-time operational statuses of the welding system 10, and so forth. For example, as depicted in FIG. 2, the color display screen 48 may be a single liquid crystal display (LCD) screen capable of displaying a selected electrode diameter (e.g., 0.030"), material thickness (e.g., ⅛"), power source welding voltage (e.g., 18.5 volts), and wire feed speed (e.g., 270 inches per minute). In certain embodiments, the welding process selector 40, the electrode diameter adjustor 42, the material thickness adjustor 44, the Auto-Set selector 46, the welding parameter adjustment dials 50 and 52, or any combination thereof, may be displayed as graphical input devices on the color display screen 48. For example, in certain embodiments, the color display screen 48 may be a touch screen configured to receive inputs from a user via such graphical input devices that are displayed on the color display screen 48. In other words, instead of (or in addition to) actual physical input devices disposed on the user interface 38, in certain embodiments, other types of user input elements, such as graphical buttons, sliders, knobs, and so forth, displayed via the color display screen 48 may be used to receive inputs from a user.

In certain embodiments, when the Auto-Set selector 46 is enabled, the color display screen 48 may automatically display acceptable ranges of values of welding voltage and wire feed speed and/or amperage based upon inputs of the required electrode diameter and/or material thickness parameters (e.g., which are set based upon manipulation of the electrode diameter adjustor 42 and the material thickness adjustor 44). As used herein, an acceptable welding parameter value range may be a range of values within which the power source 16 holds the voltage and wire feed speed and/or amperage in response to an entered or estimated value of the electrode diameter and material thickness parameters, such that a weld may be effectively executed. For example, as depicted in FIG. 2, a welding operator may input an electrode diameter of 0.030" and a material thickness of ⅛" via the user interface 38. The power source 16 may in response, for example, automatically set 18.5 volts and 270 inches per minute as appropriate welding parameter settings to effectively execute a weld for these particular electrode diameter and material thickness characteristics. The appropriate welding parameters may then be displayed via the color display screen 48. The user interface 38 also includes welding parameter adjustment dials 50 and 52, which may be used to manually adjust (e.g., increase or decrease) the voltage and wire feed speed parameters and/or amperage parameter within acceptable ranges of values, depending on the particular type of welding process selected using the welding process selector 40.

In certain embodiments, when the Auto-Set selector 46 is enabled, if there are current values for the voltage and wire feed speed parameters and/or the amperage parameter, these values may be automatically adjusted to bring them within their respective acceptable ranges of values. For example, in certain embodiments, if the current wire feed speed value is above the acceptable range of values for wire feed speed that is determined by the control circuitry 30 upon selection (e.g., activation) of the Auto-Set selector 46, then the wire feed speed may be automatically adjusted by the control circuitry 30 to bring the wire feed speed down to a value just within the acceptable range of values for the wire feed speed, down to a value just within a preferred subrange (e.g., a second acceptable range of values within the acceptable range of values) of the acceptable range of values for the wire feed speed, or down to an ideal value for the wire feed speed within the acceptable range of values. Similar adjustments may be made for current and/or voltage, as well as to bring lower values up to certain ranges or values.

In certain embodiments, upon power-up of the welding system 10, a message may be automatically displayed via the color display screen 48 prompting an operator, for example, to enable the Auto-Set function via the Auto-Set selector 46. In the case that the operator selects the Auto-Set function by activating the Auto-Set selector 46, one or more messages may subsequently prompt the operator to select both the electrode diameter and material thickness settings via the electrode diameter adjustor 42 and the material thickness adjustor 44, respectively. Similarly, messages may be automatically displayed via the color display screen 48 in the case, for example, an operator changes or switches welding processes via the welding process selector 40. These messages may be displayed to render further instructions to the operator to effectively execute the selected welding process. For example, if the welding process is switched from a TIG process to a MIG Steel C25 process, a message "PLEASE USE C25 GAS (75% AR/25% $CO_2$)" may automatically appear via the color display screen 48. Likewise, in switching from the MIG Steel C25 process to a TIG Lift-arc Remote process, a message "PLEASE USE DCEN POLARITY 100% ARGON GAS" may automatically appear via the color display screen 48. In certain embodiments, the text of such messages may be displayed on the color display screen 48 in larger than usual fonts, in colors (e.g., red, etc.) different than usual text colors (e.g., white text on a black background, or vice versa), and/or in association with colors graphics (e.g., red exclamation marks, etc.) such that the attention of the user may be better attracted. These features may provide supplemental guidance relating to appropriate welding settings (e.g., relating to shielding gases to be used, polarities to be used, and so forth) to operators or users of the welding system 10, and thus ensure that welds are performed appropriately.

As previously discussed, the Auto-Set function of the welding system 10 may be enabled or disabled via the Auto-Set selector 46 of the user interface 38. When Auto-Set is enabled, the power source 16 may automatically set welding voltage, welding amperage, and wire feed speed for a plurality of welding processes, electrode material types, and shielding gas types. When Auto-Set is disabled, the power source 16 may determine acceptable ranges of values for the welding voltage, welding amperage, and wire feed speed, thus allowing an operator to manually adjust the parameters within the acceptable ranges of values. For purposes of illustration, the aforementioned Auto-Set function will be discussed with respect to MIG or flux cored welding processes, stick welding processes, and TIG welding processes, as depicted by FIGS. 2-19.

In an embodiment, the Auto-Set selector 46 of the user interface 38 may be enabled to automatically set welding voltage and wire feed speed parameters for a MIG or flux cored welding process. In a MIG welding process, the appropriate setting of the welding voltage and wire feed speed parameters may be of particular importance, as the welding voltage generally determines the height and width of the weld bead, and the amperage of the weld arc is generally dependent upon the speed of the wire feed. In the case that the Auto-Set selector 46 is enabled, the operator may then select electrode diameter and material thickness via the electrode diameter adjustor 42 and the material thickness adjustor 44, respectively. The welding power source 16 may then automatically determine the acceptable voltage and wire feed speed parameters. For example, as depicted within the color display screen 48 of FIG. 2, which displays the MIG standby state, 0.030" represents an entered value of the electrode diameter, ⅛" represents an entered value of the material thickness, and 18.5 volts and 270 inches per minute represent the automatically determined acceptable range of values for the welding voltage and wire feed speed parameters, respectively.

In certain embodiments, as illustrated in FIG. 2, the color display screen 48 may display a plurality of discrete electrode diameter setting indicators 56 (e.g., displayed as a set of discrete points along a segmented line of a range of potentially selectable electrode diameter settings), wherein a discrete electrode diameter setting indicator 56 corresponding to the currently selected electrode diameter setting (e.g., 0.030" as illustrated in FIG. 2) is highlighted, for example, by being displayed in a relatively bright color (e.g., bright blue in certain embodiments) whereas all of the other discrete electrode diameter setting indicators 56 are displayed in a relatively neutral color (e.g., grey in certain embodiments). Accordingly, when a user selects an electrode diameter via the electrode diameter adjustor 42, the appropriate discrete electrode diameter setting indicator 56 is selected. The plurality of discrete electrode diameter setting indicators 56 are intended to aid the user to know where, within a range of potentially selectable electrode diameter settings, the currently selected electrode diameter setting is. As described herein, the number of discrete electrode diameter setting indicators 56 that are displayed by the color display screen 48 is determined based on other settings entered by the user. For example, in certain embodiments, based on all of the other settings entered via the user interface 38, the color display screen 48 will only display discrete electrode diameter setting indicators 56 that correspond to electrode diameter settings that make sense based on these other entered settings.

Similarly, as illustrated in FIG. 2, the color display screen 48 may display a plurality of discrete material thickness setting indicators 58 (e.g., displayed as a set of discrete points along a segmented line of a range of potentially selectable material thickness settings), wherein a discrete material thickness setting indicator 58 corresponding to the currently selected material thickness setting (e.g., ⅛" as illustrated in FIG. 2) is highlighted, for example, by being displayed in a relatively bright color (e.g., bright blue in certain embodiments) whereas all of the other discrete material thickness setting indicators 58 are displayed in a relatively neutral color (e.g., grey in certain embodiments). Accordingly, when a user selects a material thickness via the material thickness adjustor 44, the appropriate discrete material thickness setting indicator 58 is selected. The plurality of discrete material thickness setting indicators 58 are intended to aid the user to know where, within a range of potentially selectable material thickness settings, the currently selected material thickness setting is. As described herein, the number of discrete material thickness setting indicators 58 that are displayed by the color display screen 48 is determined based on other settings entered by the user. For example, in certain embodiments, based on all of the other settings entered via the user interface 38, the color display screen 48 will only display discrete material thickness setting indicators 58 that correspond to material thickness settings that make sense based on these other entered settings.

The color display screen 48 may then display graphical range indicators 60 and 62, for example, in which the graphical range indicators 60 and 62 depict (e.g., display varying colors and/or movement of a range bar) whether the welding voltage and/or wire feed speed parameters are in the acceptable ranges of values as an operator adjusts one or both of the welding parameter adjustment dials 50 and 52. As such, when the operator makes adjustments via one (or both) of the welding parameter adjustment dials 50 and 52, the graphical range indicators 60 and 62 (which relate to the parameters being adjusted by the welding parameter adjustment dials 50 and 52, respectively) on the color display screen 48 depict acceptable ranges of values for their respective welding parameters (e.g., voltage and wire feed speed in the embodiment illustrated in FIG. 2). In general, when one of the welding parameter adjustment dials 50 and 52 is manipulated (e.g., the welding parameter adjustment dial 52 relating to wire feed speed being adjusted in FIG. 2), an acceptable range of values for the related welding parameter (e.g., wire feed speed in FIG. 2) is illustrated on the color display screen 48, and a slider indicating the current value (e.g., the slider 74 of the graphical range indicator 62) is shown within the acceptable range, whereas an acceptable range of values for the other welding parameter (e.g., voltage in FIG. 2) is illustrated on the color display screen 48. In addition, in certain embodiments, the welding parameter adjustment dials 50 and 52 may be configured to only accept values that fall within the acceptable ranges of values for the welding parameters. For example, when manual adjustments are attempted via the welding parameter adjustment dials 50 and 52 that would bring their respective parameters to values outside of their respective acceptable range of values, such manual adjustments may simply be ignored by the control circuitry 30, and not indicated as having any effect on the parameters via the display screen 48. Furthermore, in certain embodiments, the graphical range indicators 60 and 62 may only be displayed on the color display screen 48 for a predetermined (e.g., pre-set as a setting of the welding system 10) amount of time (e.g., 15 seconds, 10 seconds, 5 seconds, 3 seconds, or some other predetermined amount of time) after an input is received via the welding parameter adjustment dials 50 and 52.

Conversely, in the case that the Auto-Set selector 46 is disabled, the operator may then manually adjust (e.g. increase or decrease) the welding voltage and wire feed speed parameters within an acceptable range of values (e.g., by manipulating the welding parameter adjustment dials 50 and 52, which correspond to the parameter displayed on the color display screen 48 directly above respective welding parameter adjustment dial 50 and 52). As such, it will be appreciated that, depending on the welding parameter adjustment dials 50 and 52 that are being manipulated, either of the graphical range indicators 60 and 62 may include a reticle 72 or a slider 74 within its respective acceptable range graphic.

As described herein, in certain embodiments, the reticles 72 and/or the sliders 74 may be displayed in varying colors to aid the user in ascertaining how to adjust the welding parameter adjustment dial 50 and 52. For example, in certain embodiments, the reticles 72 may be displayed in a particular color (e.g., blue in certain embodiments) and the sliders 74 may be displayed in different colors than the reticles 72 such that the user may easily distinguish the two situations. In addition, it is noted that the acceptable range graphics may include three distinct segments in certain embodiments. For example, the middle segment of the acceptable range graphics may correspond to a "preferred" subset (e.g., subrange) of the acceptable range of values, as determined by the control circuitry 30, whereas the two side segments of the acceptable range graphics may correspond to values that are still within the acceptable range of values, but are not as preferred. In certain embodiments, when the sliders 74 are within the middle segment of the acceptable range of values, the sliders 74 may be displayed in a first color (e.g., green in certain embodiments), whereas when the sliders 74 are within the side segments of the acceptable range of values, the sliders 74 may be displayed in a second color (e.g., yellow in certain embodiments) to denote that the currently selected value is no longer within the preferred subset of the acceptable range of values but is still within the acceptable range of values. Furthermore, in certain embodiments, when the sliders 74 reach the outer bounds of the acceptable range of values, the sliders 74 may be displayed in a third color (e.g., red in certain embodiments) to denote that the currently selected value is no longer within the acceptable range of values. In other embodiments, the color of the sliders 74 may vary based on the magnitude of the current value for the respective parameter. For example, if the current amperage value is at a lower end of its acceptable range of values, the color of the respective slider 74 may be blue, whereas if the current amperage value is at a higher end of its acceptable range of values, the color of the respective slider 74 may be red, and while the amperage value changes from the lower end to the higher end, the color of the respective slider 74 may gradually transition between blue and red. Such an embodiment would be intended to convey a relative amount of heat input into the welding application.

Figure 3:
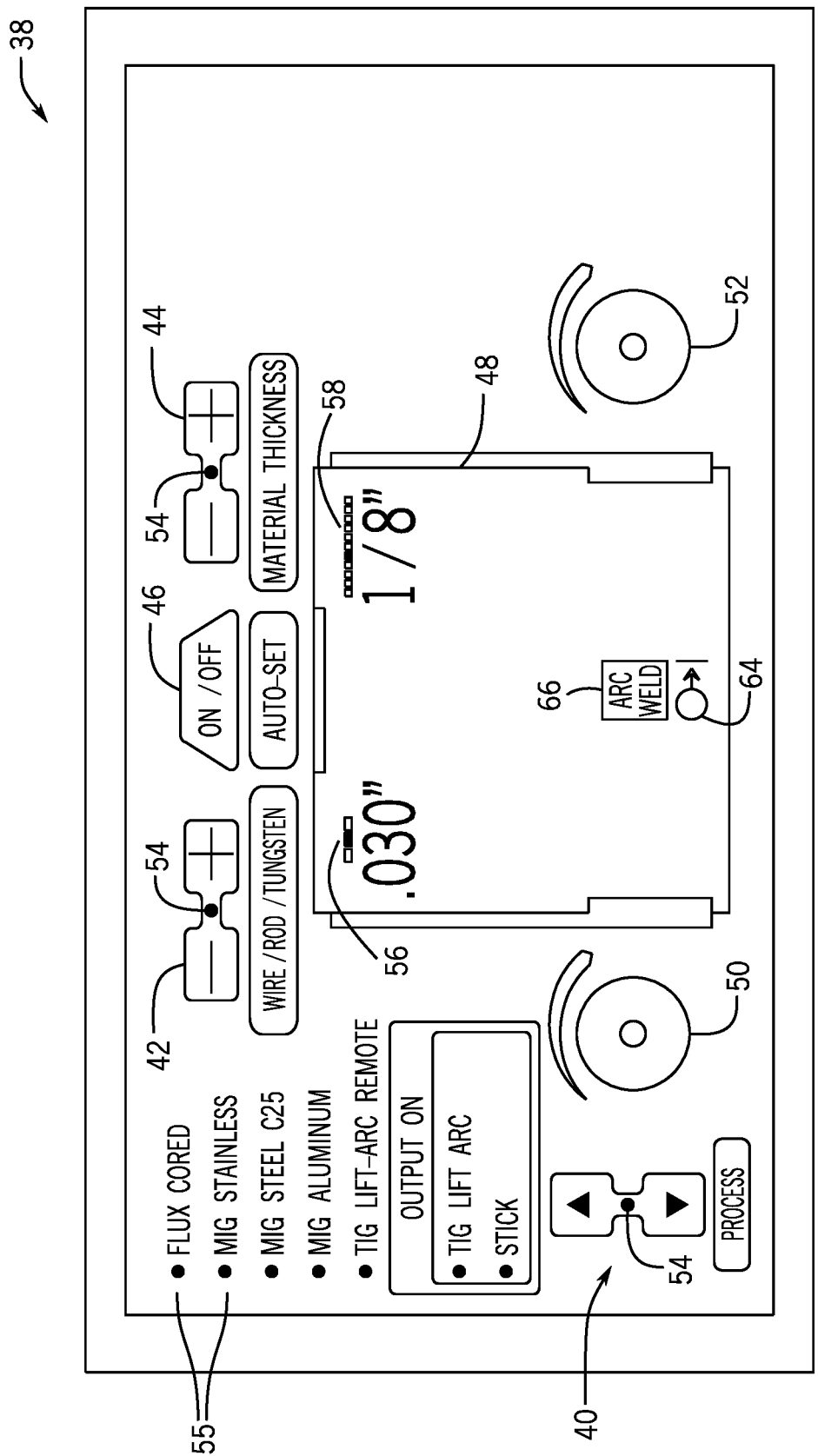
FIG. 3 is a front view of an embodiment of the interface for a MIG or flux cored weld state including Auto-Set welding parameters and output and arc weld graphical indicators.

The color display screen 48 of FIG. 3 displays the MIG weld state, during an operator or user executes a weld. An output graphical indicator 64 indicates that there is currently an output of power from the power source 16, and an arc weld graphical indicator 66 indicates that the power source 16 is sustaining a welding arc. Hence, the output graphical indicator 64 and the arc weld graphical indicator 66 may each further indicate to an operator, for example, that the welding voltage, welding amperage, and wire feed speed parameters are within acceptable ranges of values. As such, in certain embodiments, the arc weld graphical indicator 66 may be displayed in a color (e.g., green in certain embodiments) that indicates to the user that all of these parameters are within acceptable ranges of values.

Figure 4:
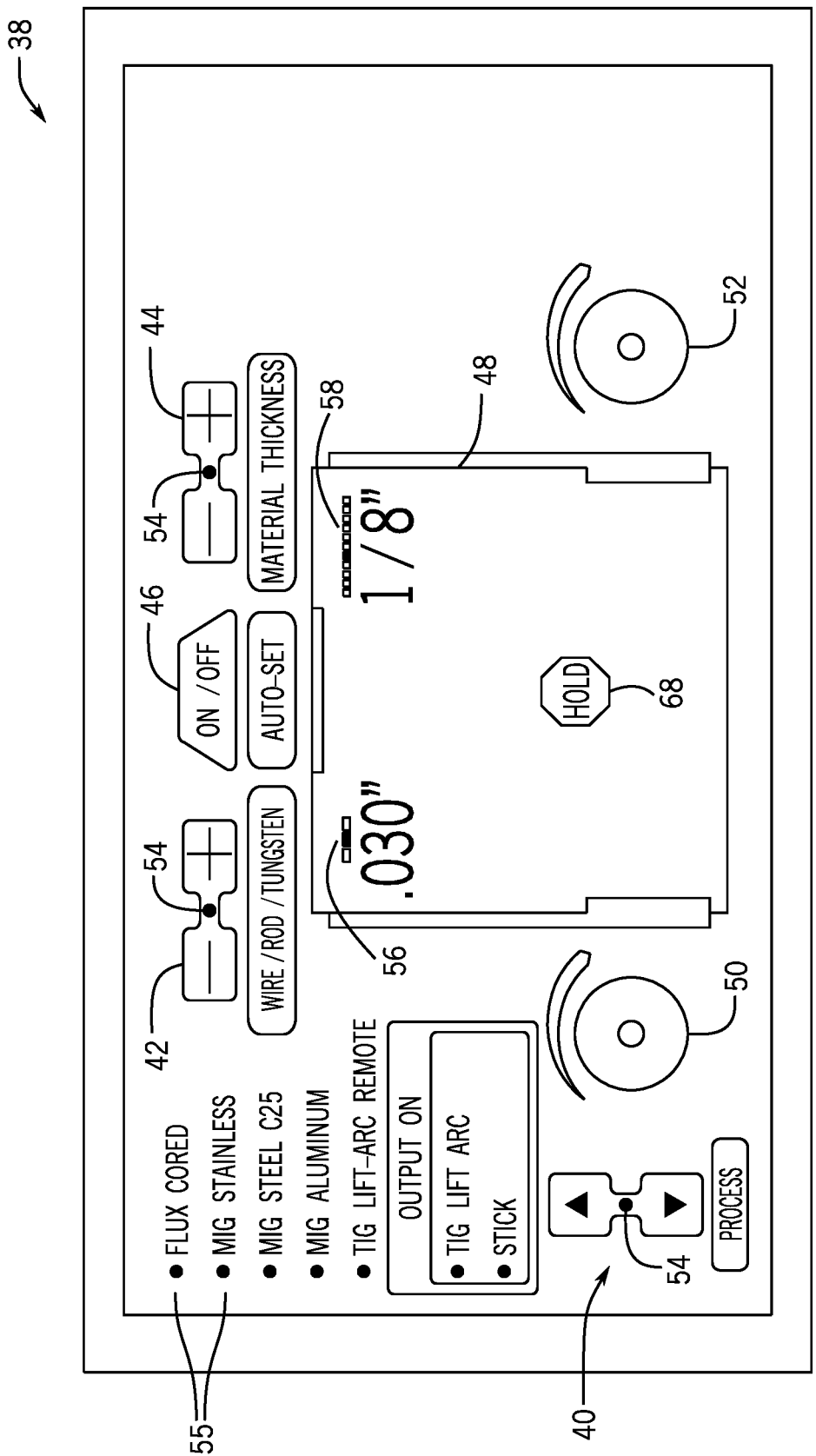
FIG. 4 is a front view of an embodiment of the interface for a MIG or flux cored hold state including Auto-Set welding parameters and a hold graphical indicator.
Figure 5:
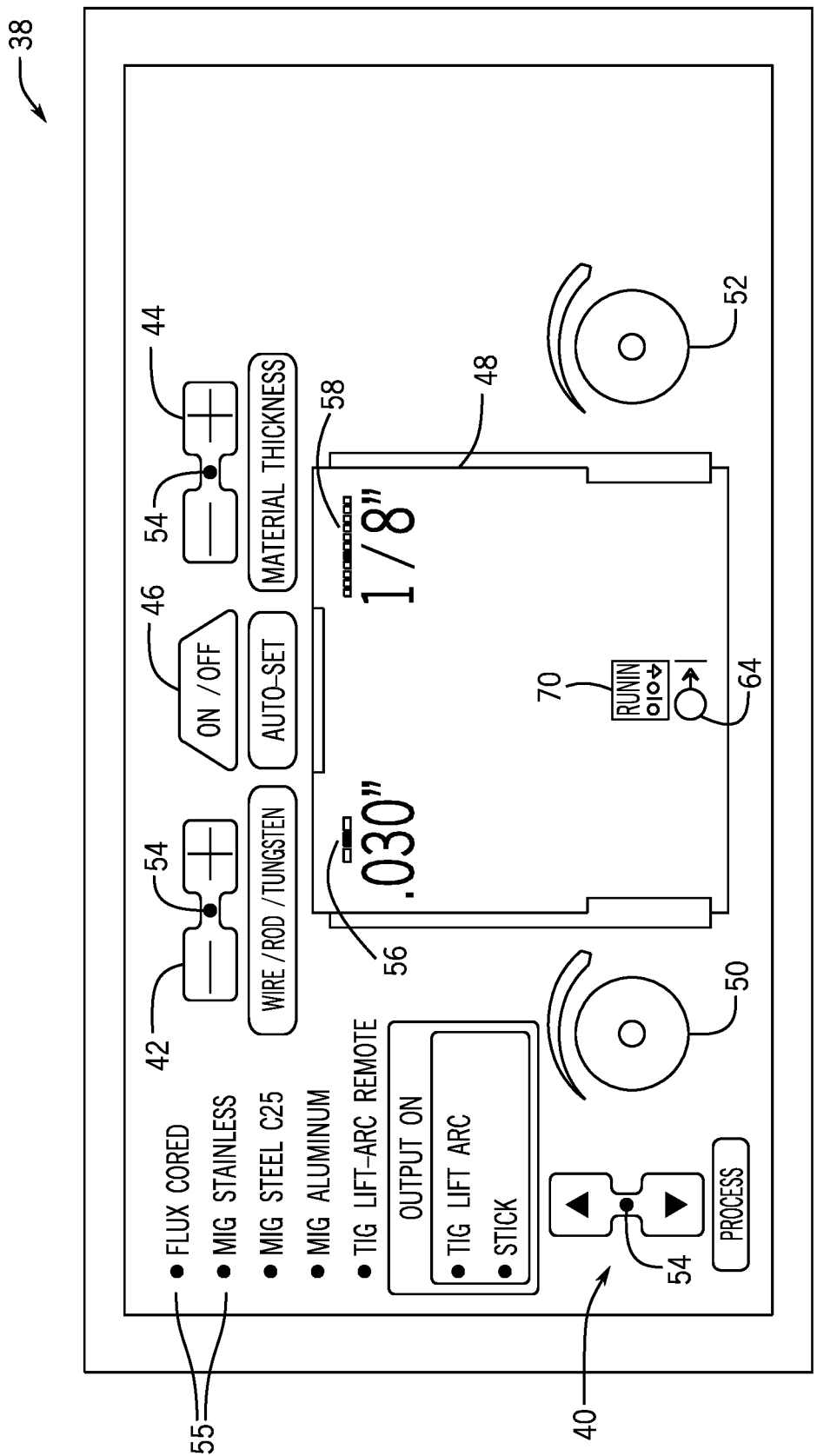
FIG. 5 is a front view of an embodiment of the interface for a MIG or flux cored OCV state including Auto-Set welding parameters and a run-in speed graphical indicator.

The color display screen 48 may also continue to display the welding parameters for a duration of time after a weld is completed and/or terminated. For example, as depicted in FIG. 4, the color display screen 48 may assume a hold state (e.g., indicated by a hold state indicator 68) for a duration of time after a weld completion or termination, such that the operator, for example, may note the preceding operating welding voltage and welding amperage parameters. In certain embodiments, the hold state indicator 68 may be displayed in a relatively neutral color (e.g., grey in certain embodiments) to denote that the system is currently in a hold state. Similarly, the color display screen 48 of FIG. 5 displays the MIG open circuit voltage (OCV) state, in which the output graphical indicator 64 signals that there is currently an output power from the power source 16. However, no welding arc is generated at the depicted parameter settings. A run-in graphical indicator 70 signals the wire feed speed is at run-in speed, which is the speed of the wire feed from the time the trigger 24 of the welding torch 12 is depressed until the initiation of a welding arc. In certain embodiments, the run-in graphical indicator 70 may be similarly displayed in a relatively neutral color (e.g., grey in certain embodiments).

Figure 7:
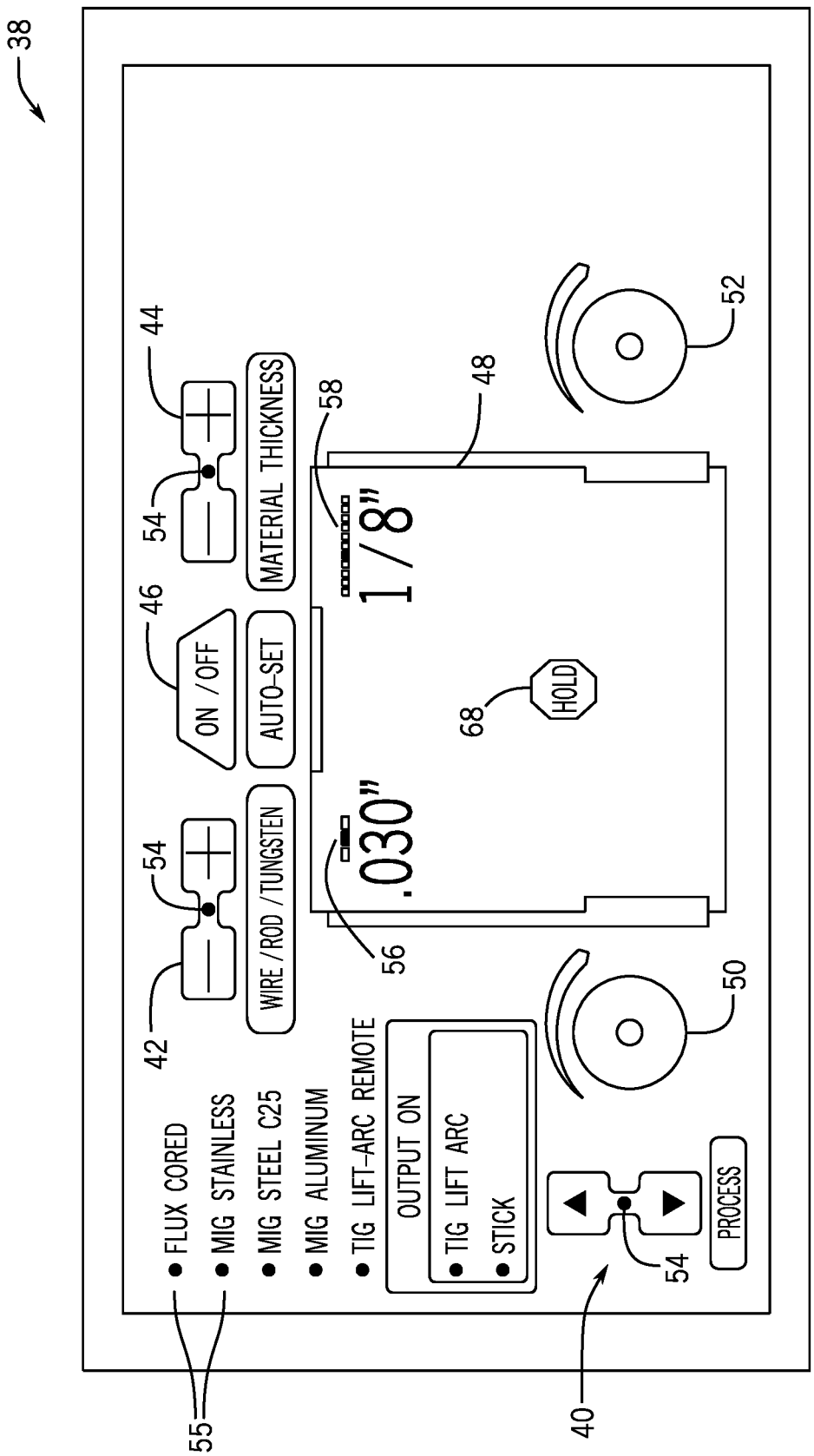
FIG. 7 is a front view of an embodiment of the interface for a stick hold state including Auto-Set welding parameters and hold, output, and arc weld graphical indicators.
Figure 8:
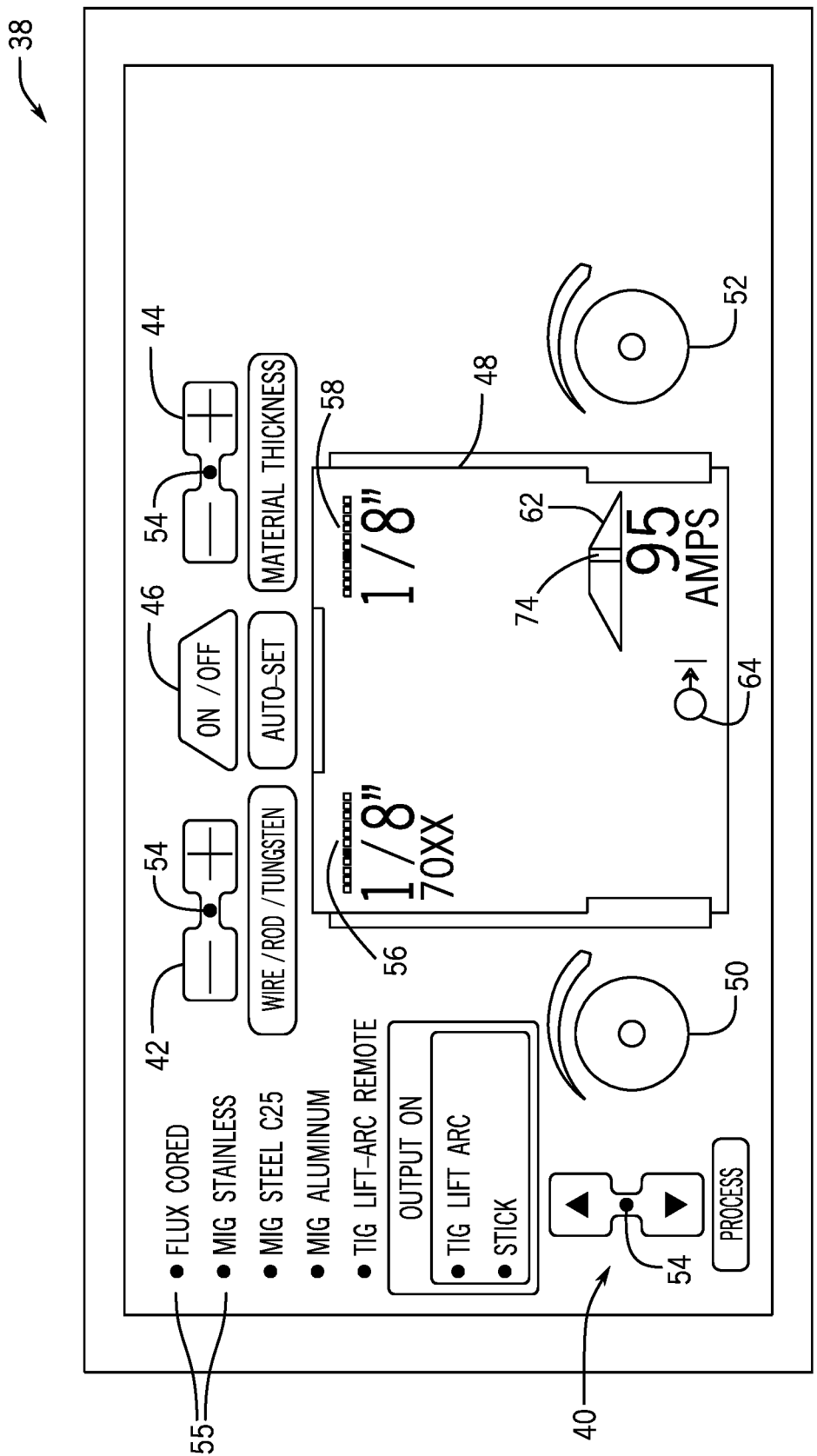
FIG. 8 is a front view of an embodiment of the interface for a stick OCV state including Auto-Set welding parameters and an output graphical indicator.
Figure 9:
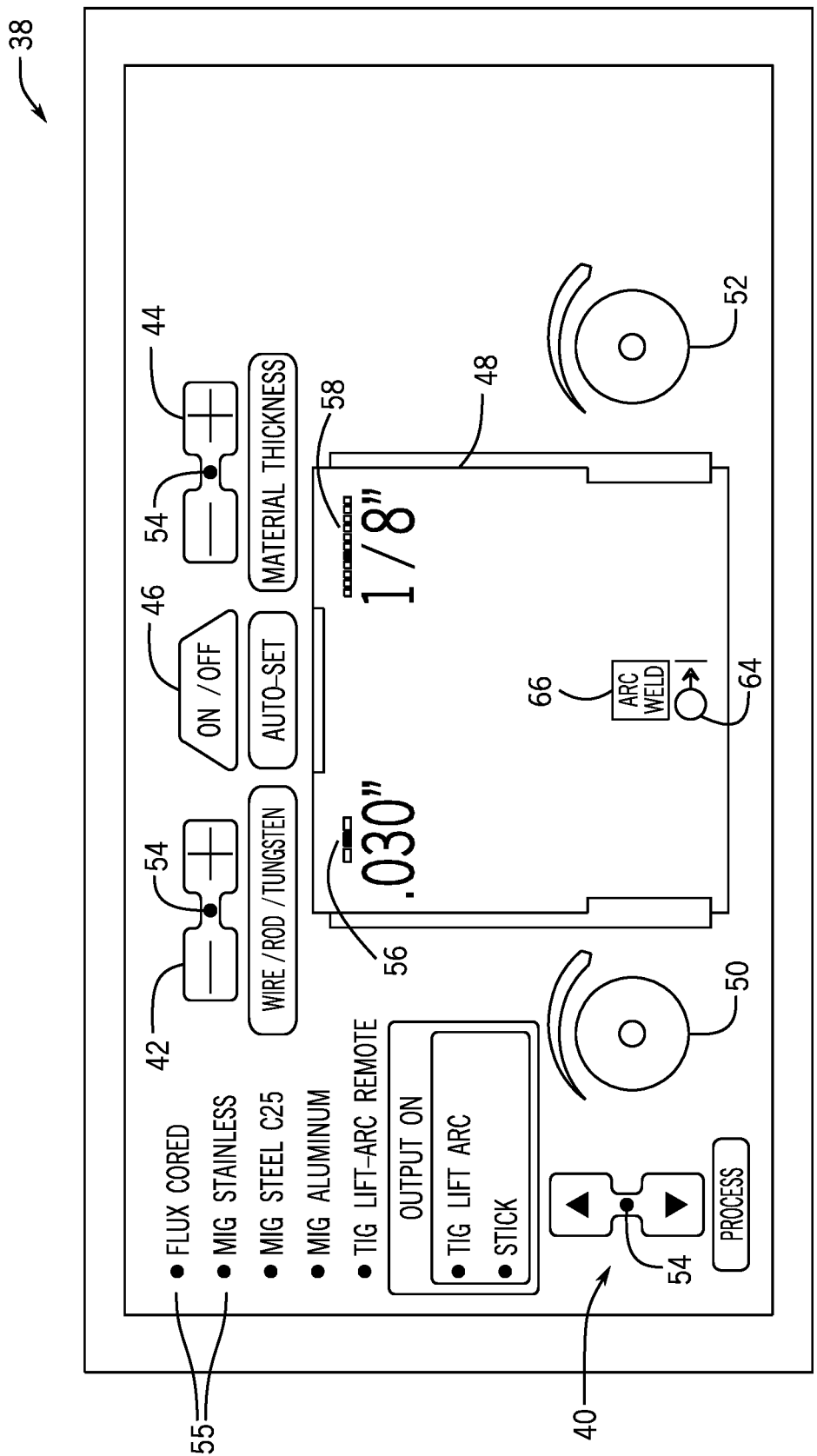
FIG. 9 is a front view of an embodiment of the interface for a TIG weld state including Auto-Set welding parameters and output and arc weld graphical indicators.
Figure 10:
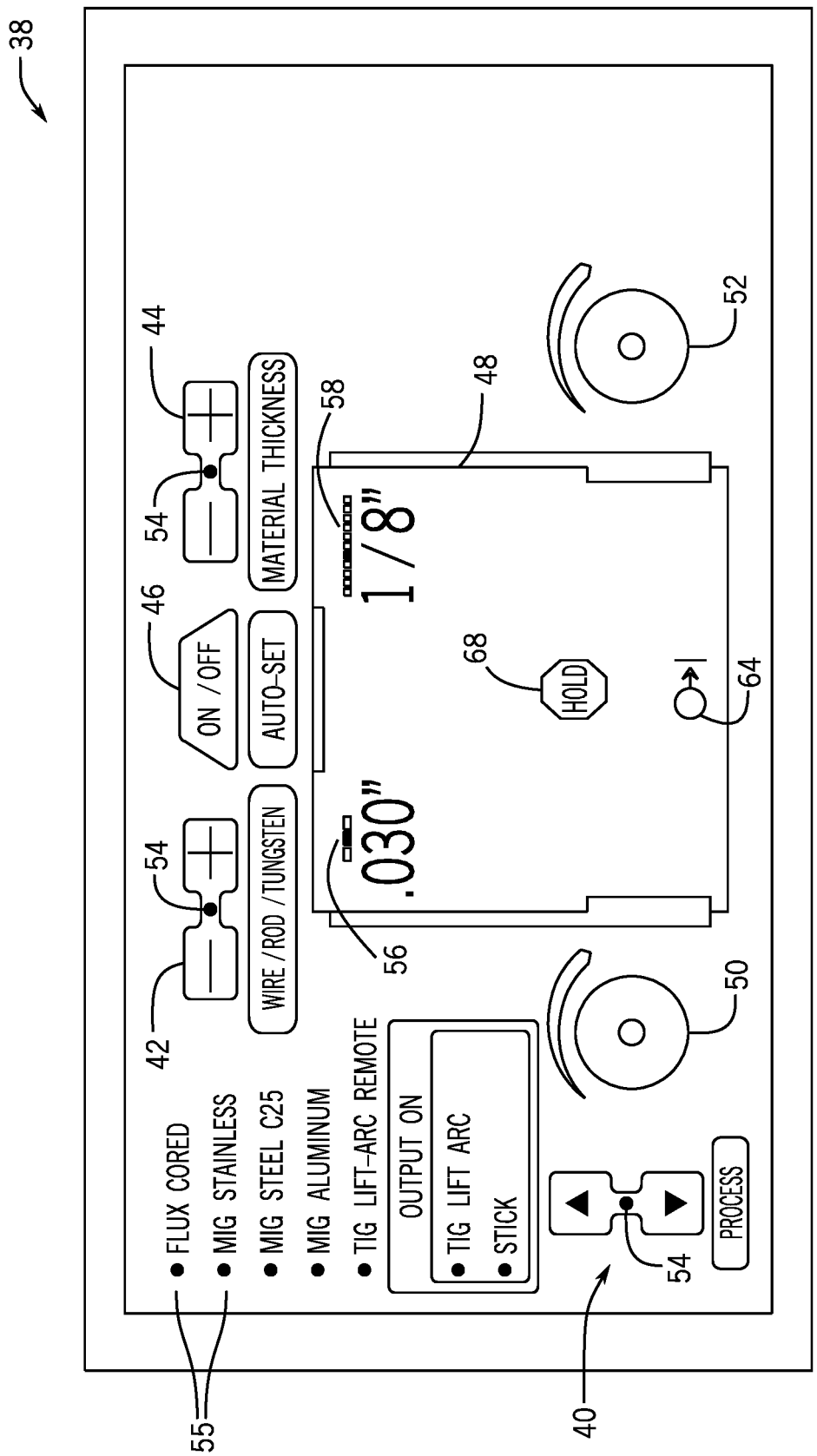
FIG. 10 is a front view of an embodiment of the interface for a TIG hold state including Auto-Set welding parameters and output and a hold graphical indicators.

In other embodiments, the Auto-Set selector 46 of the user interface 38 may be enabled to automatically set welding amperage for stick and TIG welding processes. In a stick or TIG welding process, the appropriate setting of the welding amperage (i.e., electrical current) may be of paramount significance, as the welding amperage and material thickness, in particular, determines the intensity of the welding arc. Henceforth, FIGS. 6-8 are discussed for the purpose of illustration of the stick welding process, FIGS. 9-13 are discussed for the purpose of illustration of the TIG welding process, and similarly, FIGS. 14-19 are discussed for the purpose of illustration of the TIG remote welding process.

Similar to the previously discussed MIG process, in the case that the Auto-Set selector 46 is enabled, the operator may then select electrode diameter and material thickness via the electrode diameter adjustor 42 and the material thickness adjustor 44, respectively. The welding power source 16 may then automatically determine the acceptable amperage parameters. The output graphical indicator 64 signals an output of the power source 16, and the graphical range indicator 62 indicates the acceptable range of values for the amperage parameter as an operator, for example, makes adjustments to the amperage parameter via the welding parameter adjustment dial 52.

As such, when the operator adjusts the amperage parameter via the welding parameter adjustment dial 52, the acceptable range of values for the amperage parameter is illustrated on the color display screen 48, and a slider indicating the current value (e.g., the slider 74 of the graphical range indicator 62) is shown within the acceptable range. Again, in certain embodiments, the welding parameter adjustment dial 52 is configured to only accept values that fall within the acceptable ranges of values for the amperage parameter, which may be determined based on the other parameters input via the user interface 38 (e.g., welding process type input via the welding process selector 40, electrode diameter input via the electrode diameter adjustor 42, material thickness input via the material thickness adjustor 44, and so forth, or a combination thereof) when Auto-Set is enabled (e.g., via activation of the Auto-Set selector 46). As discussed above with respect to FIG. 2, in certain embodiments, the reticles 72 and/or the sliders 74 may be displayed in varying colors to aid the user in ascertaining how to adjust the welding parameter adjustment dial 50 and 52.

Figure 6:
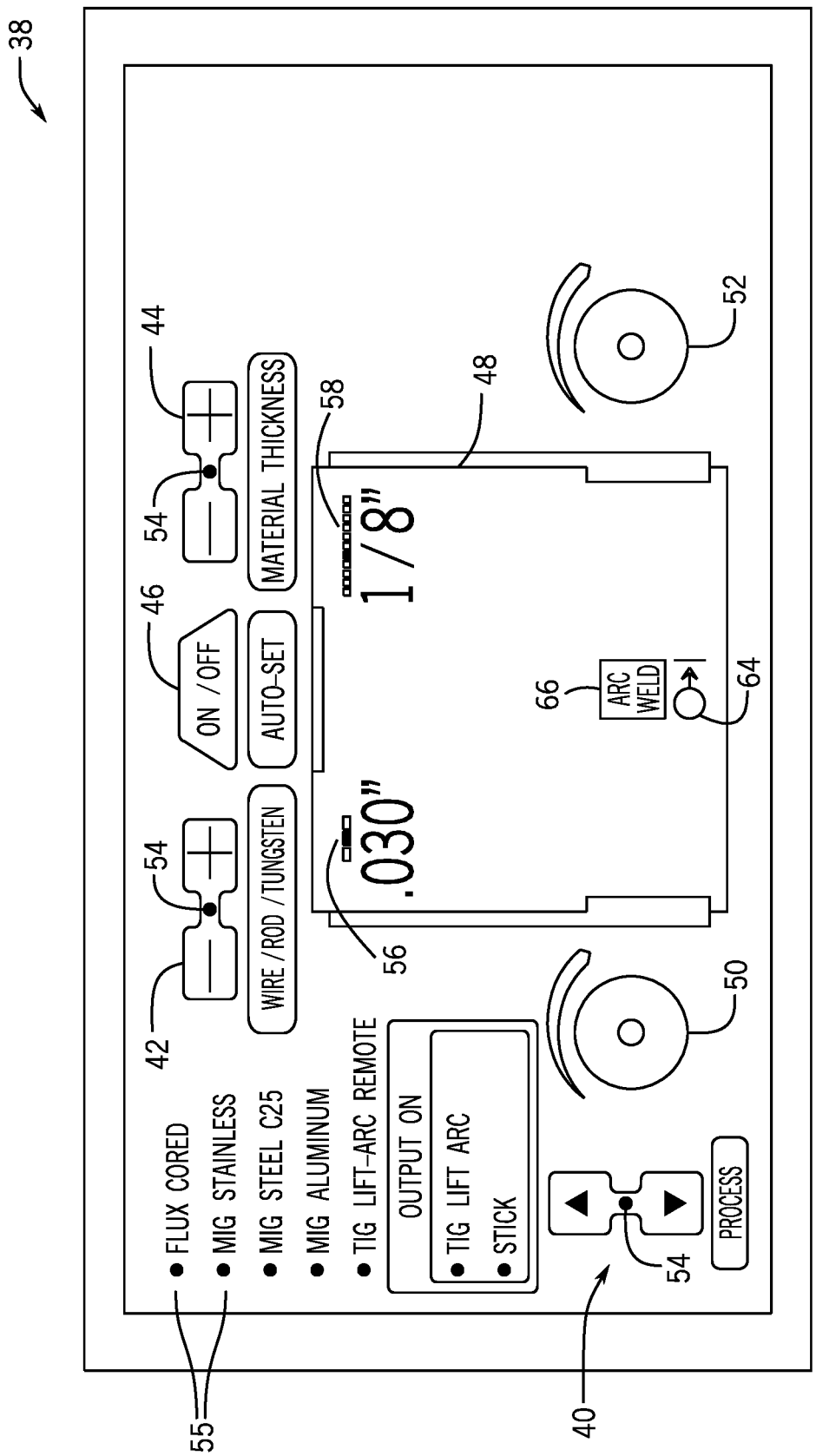
FIG. 6 is a front view of an embodiment of the interface for a stick weld state including Auto-Set welding parameters and output and arc weld graphical indicators.

FIG. 6 displays the stick weld state, in which, for example, output power at 24 volts and 95 amps is sustained from the power source 16 while an operator or user executes a weld. FIG. 7 displays the stick hold state, in which, for example, the color display screen 48 maintains display of the previous state for a duration of time after a weld completion or termination. FIG. 8 displays the stick open circuit voltage (OCV) state, in which the output graphical indicator 64 indicates that there is currently an output voltage from the power source 16. However, no welding arc is generated at the depicted parameter settings.

Figure 11:
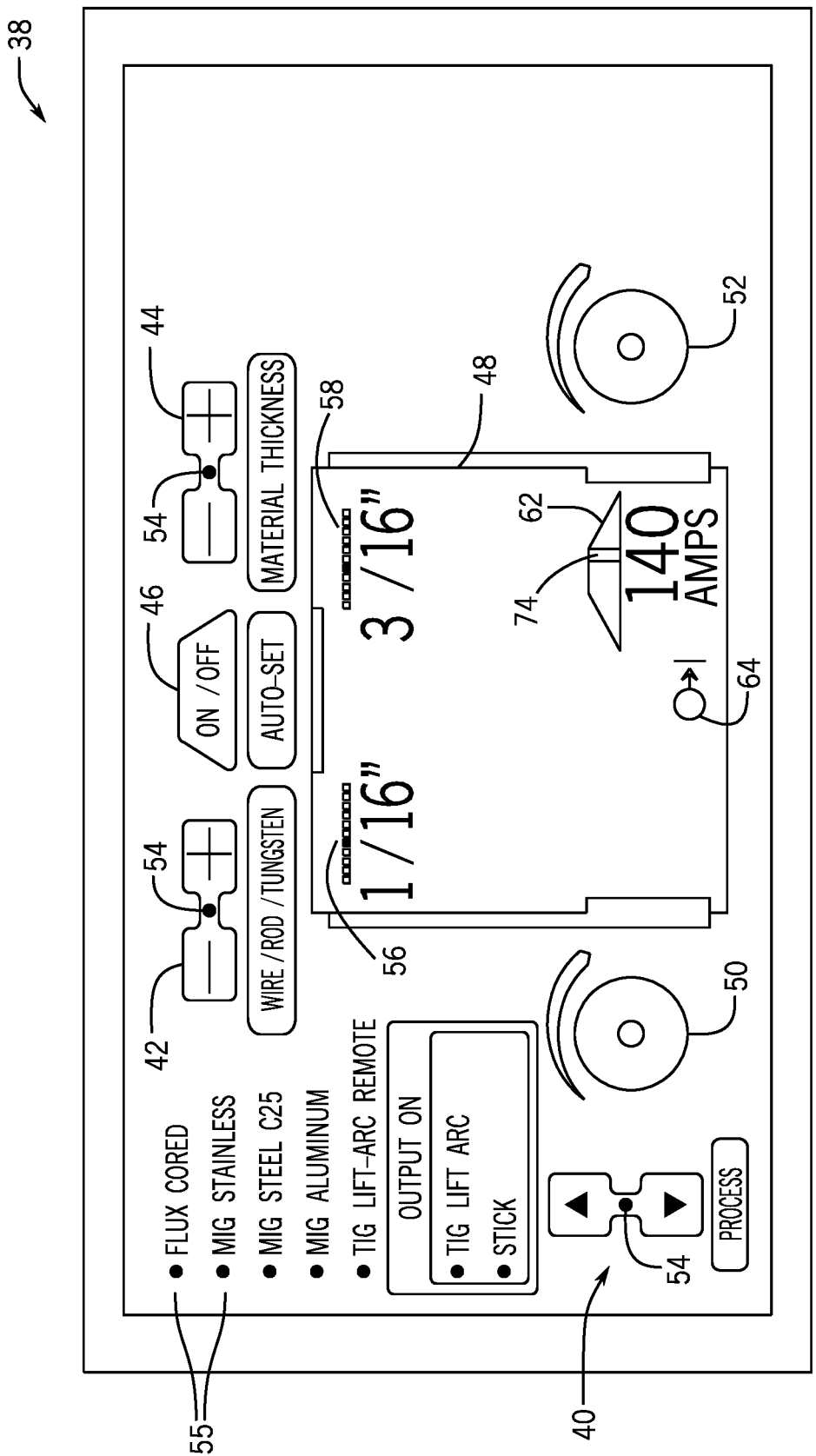
FIG. 11 is a front view of an embodiment of the interface for a TIG OCV state including Auto-Set welding parameters and an output graphical indicator.

As noted above, a TIG and/or TIG remote welding process may depend heavily on the material thickness and the amperage welding parameter. The TIG process typically features a non-consumable tungsten electrode to generate a weld, in which the tungsten electrode is guarded by an inert shielding gas. Further, in comparison to previously discussed welding processes (e.g., MIG, flux cored, stick, etc.), the TIG process may require that additional welding parameters and characteristics be monitored and communicated to an operator of welding system 10. With the foregoing in mind, similar to the other welding processes, the color display screen 48 illustrated in FIG. 9 displays the TIG weld state. Like the other welding process, the TIG weld state is the state in which the appropriate voltage (e.g., 12.0 volts) and welding amperage (e.g., 140 amps) are displayed while an operator or user executes a weld. The color display screen 48 illustrated in FIG. 10 displays the TIG hold state, which continues for a duration of time after a weld completion or termination, such that the operator, for example, may note the preceding operating welding voltage and welding amperage parameters. FIG. 11 displays the TIG open circuit voltage (OCV) state, in which again the output graphical indicator 64 indicates that there is currently a power output on power source 16, but that no welding arc is being maintained.

Figure 12:
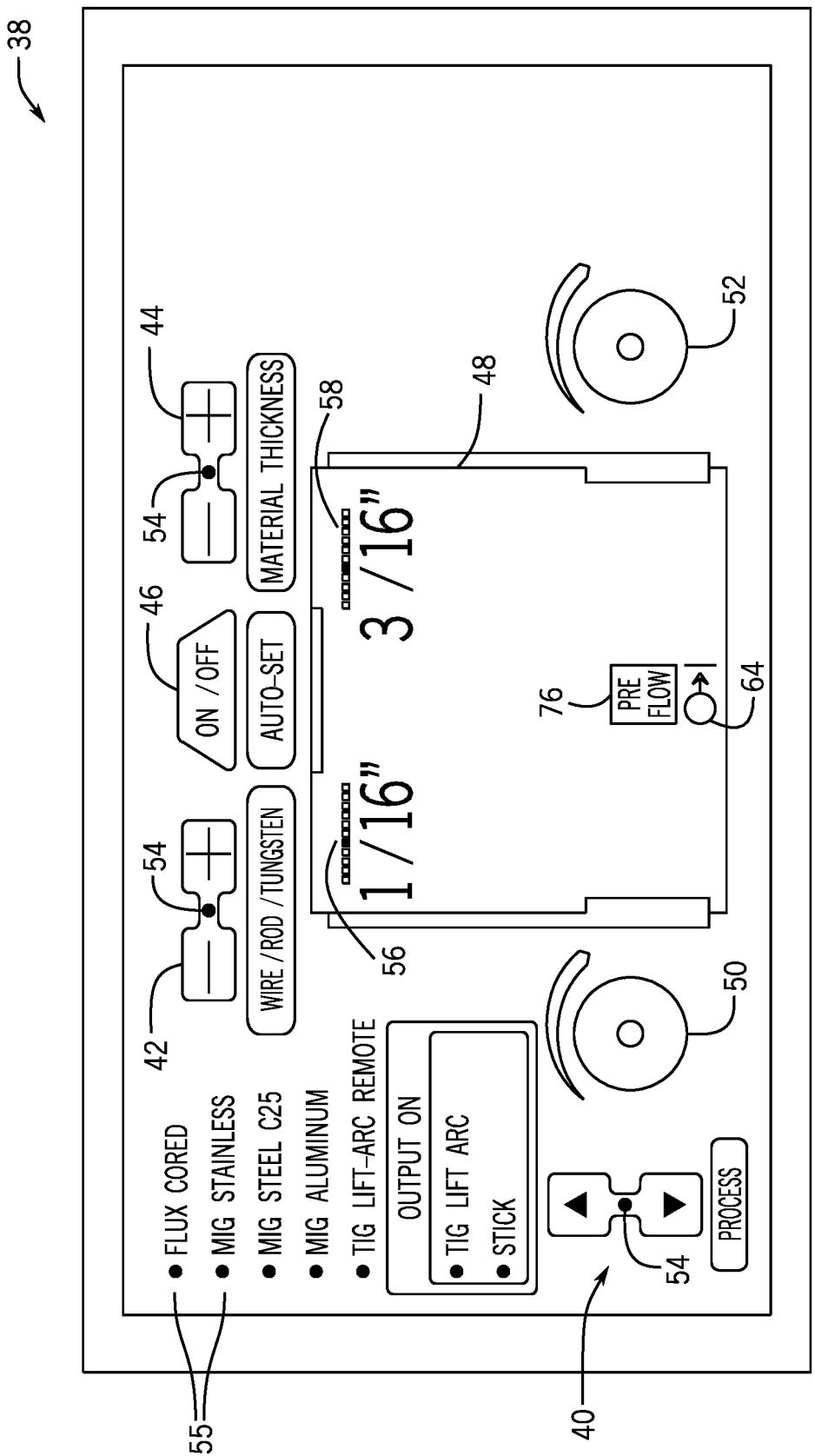
FIG. 12 is a front view of an embodiment of the interface for a TIG pre-flow state including Auto-Set welding parameters and output and pre-flow graphical indicators.
Figure 13:
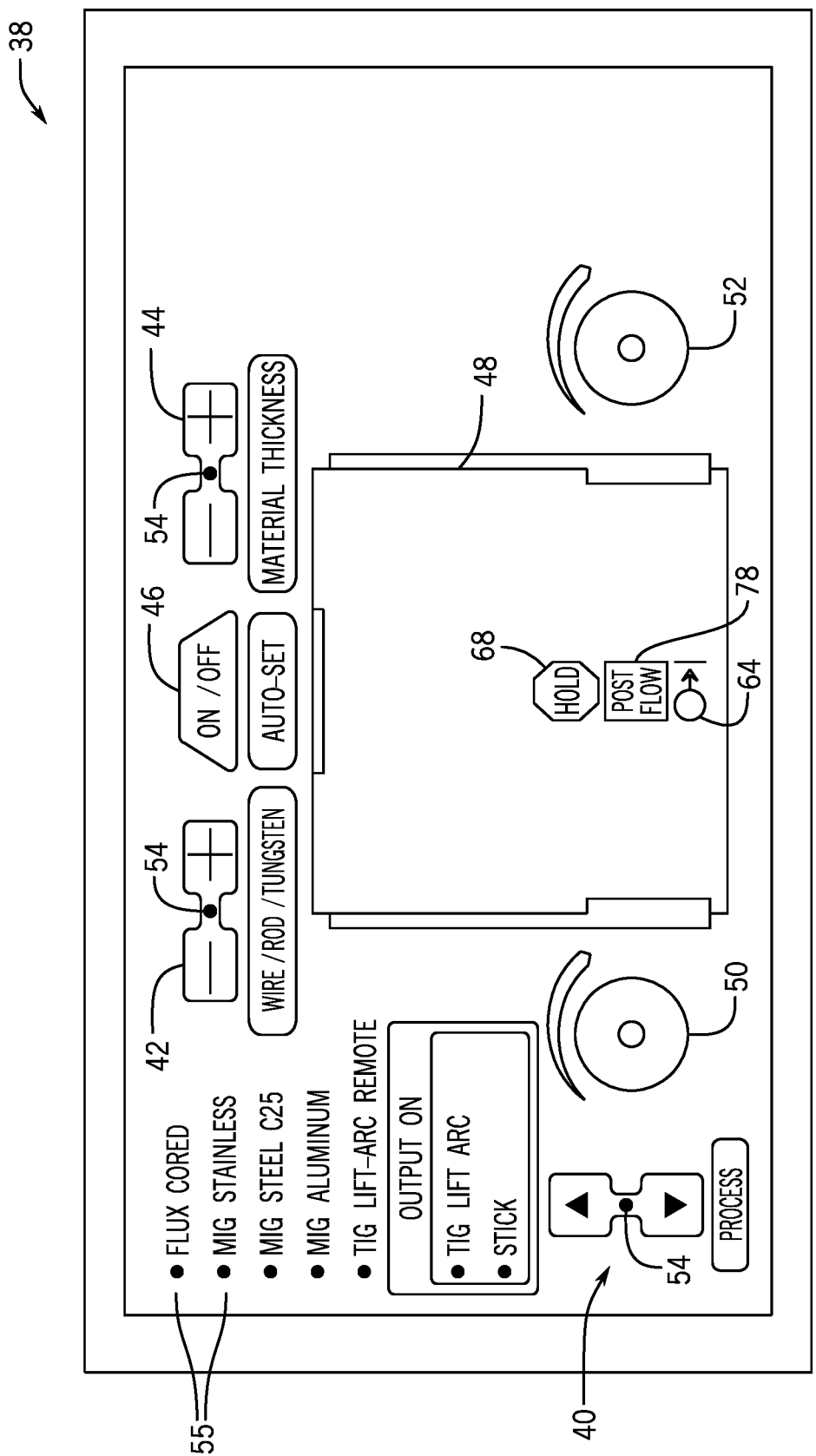
FIG. 13 is a front view of an embodiment of the interface for a TIG post-flow state including Auto-Set welding parameters and hold, output, and post-flow graphical indicators.

As depicted in FIG. 12, and disparate from the previously discussed welding processes, the TIG Auto-Set function may include a pre-flow state and a post-flow state. The TIG pre-flow state is the state in which inert gas flows prior to the generation of a welding arc to displace and shield the area of the arc before ignition. For example, as depicted within the color display screen 48 illustrated in FIG. 12, the electrode diameter and material thickness may be respectively set at ¹⁄₁₆" and ³⁄₁₆" inches. A pre-flow graphical indicator 76 may automatically indicate to an operator that the inert gas has begun to flow prior to the generation of the welding arc. FIG. 13 depicts the TIG post-flow state, where a post-flow graphical indicator 78 automatically indicates the post-flow state.

Figure 14:
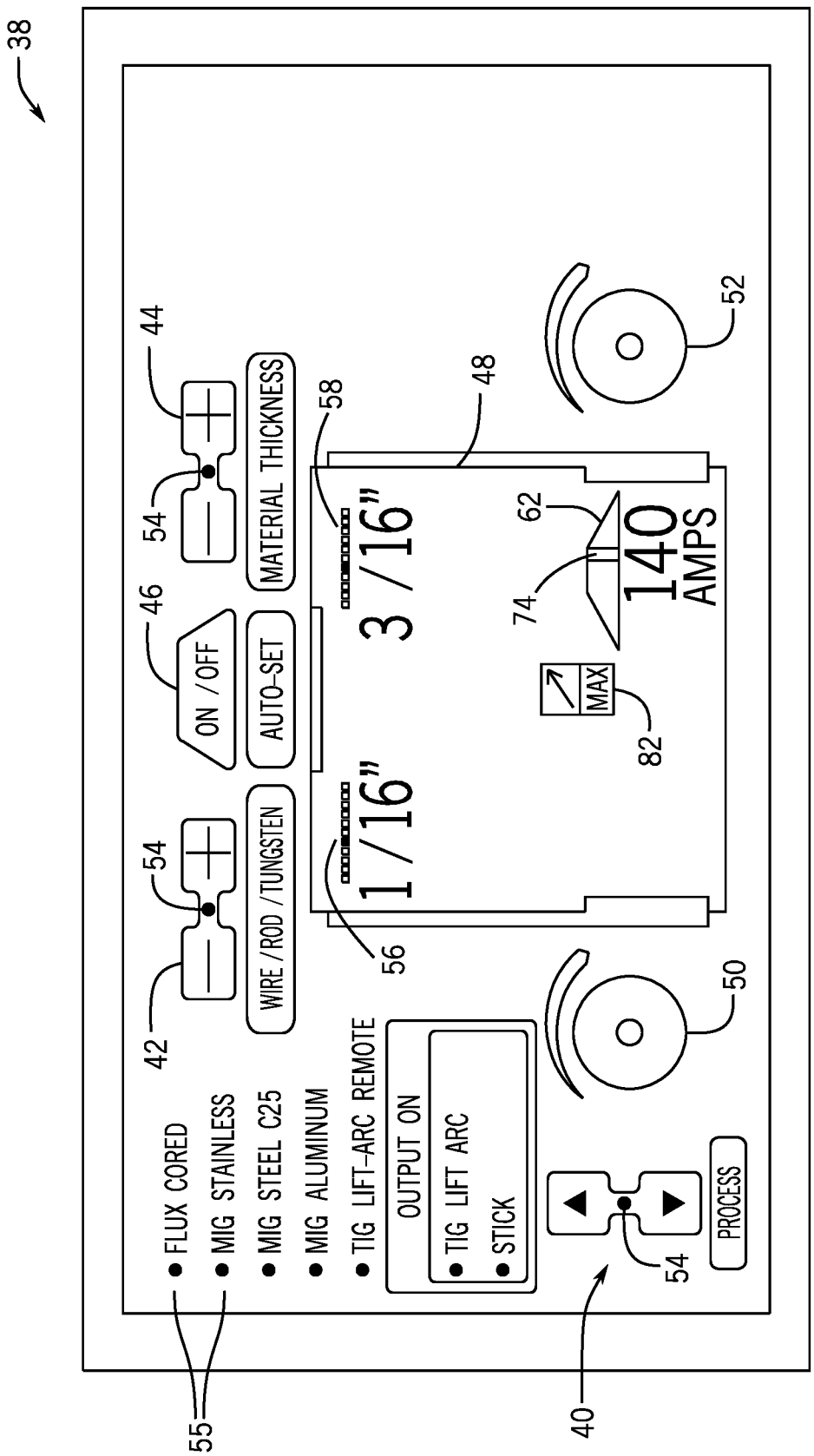
FIG. 14 is a front view of an embodiment of the interface for a TIG remote standby state including Auto-Set welding parameters and a remote graphical indicator.
Figure 15:
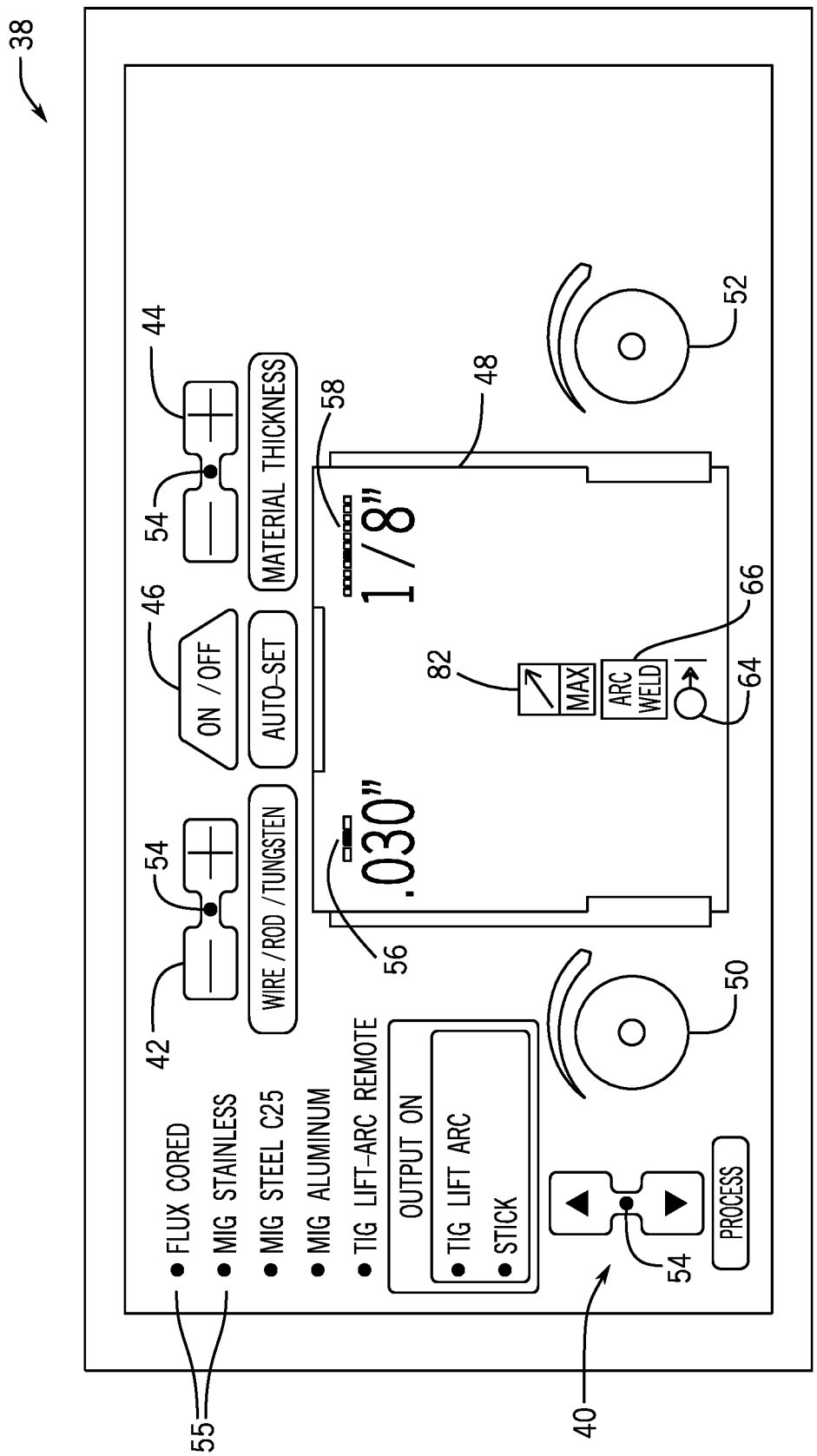
FIG. 15 is a front view of an embodiment of the interface for a TIG remote weld state including Auto-Set welding parameters and remote, arc weld, and output graphical indicators.
Figure 16:
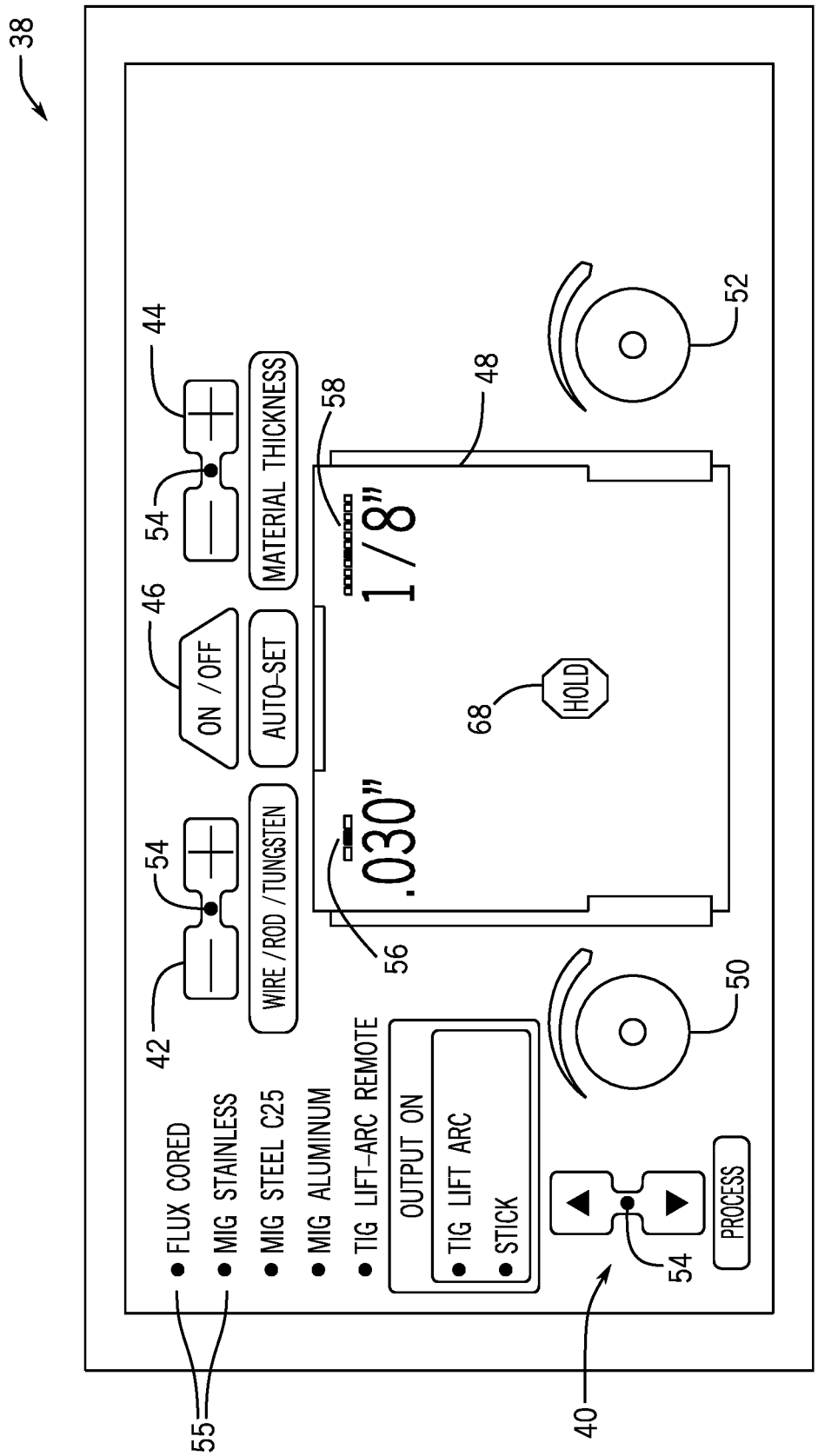
FIG. 16 is a front view of an embodiment of the interface for a TIG remote hold state including Auto-Set welding parameters and a hold graphical indicator.
Figure 17:
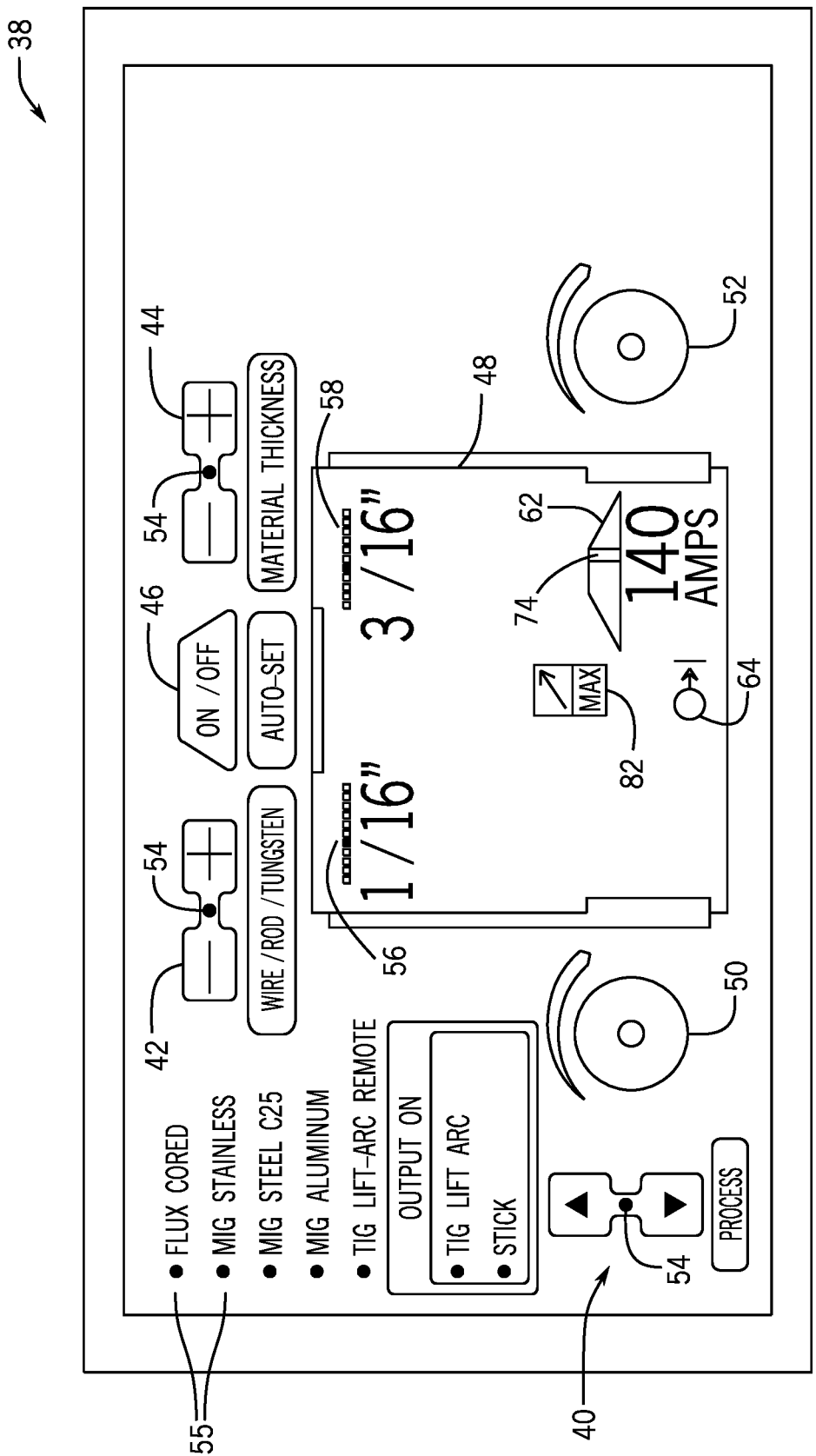
FIG. 17 is a front view of an embodiment of the interface for a TIG remote OCV state including Auto-Set welding parameters and remote and output graphical indicators.
Figure 18:
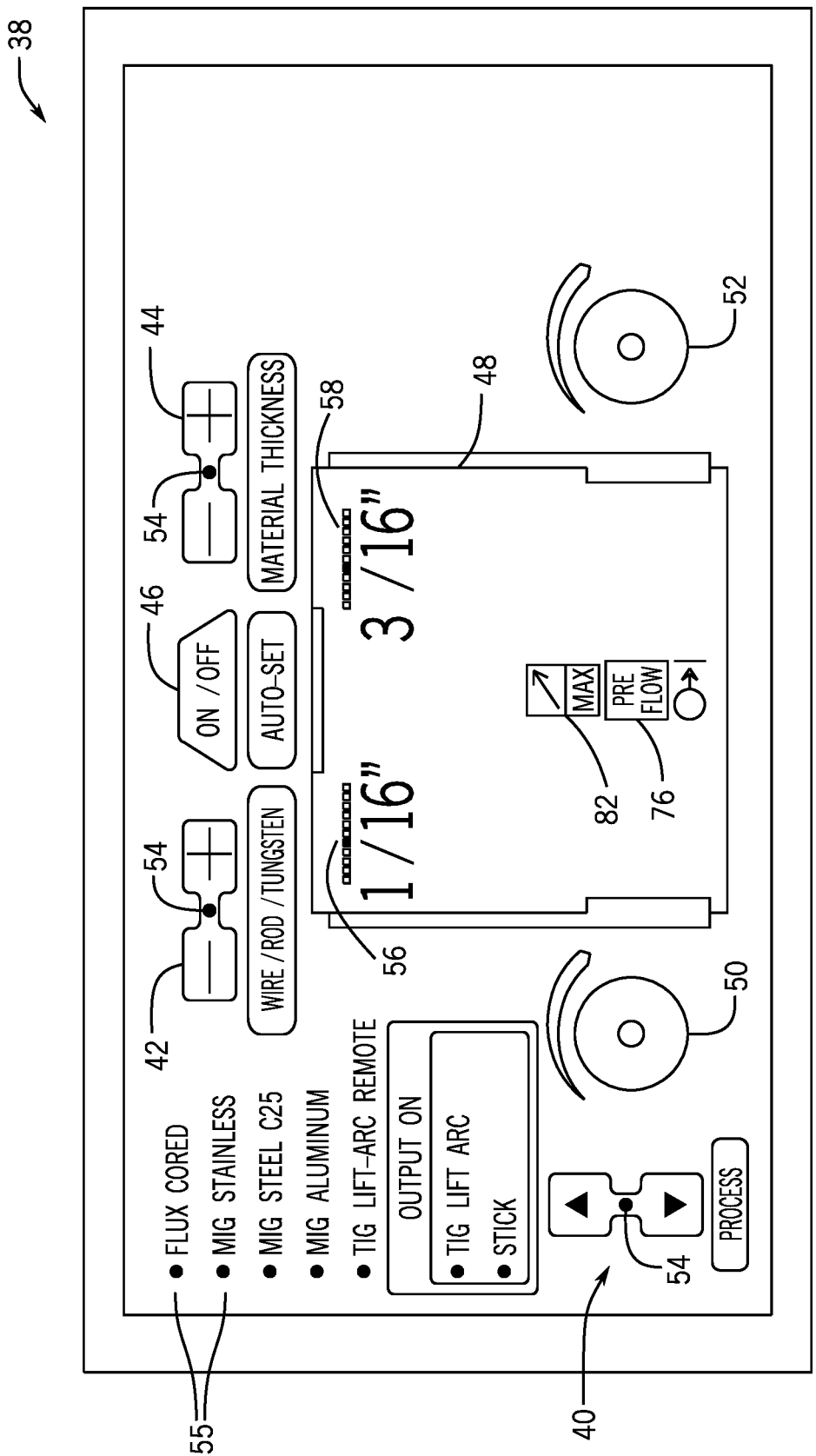
FIG. 18 is a front view of an embodiment of the interface for a TIG remote pre-flow state including Auto-Set welding parameters and remote, pre-flow, and output graphical indicators.
Figure 19:
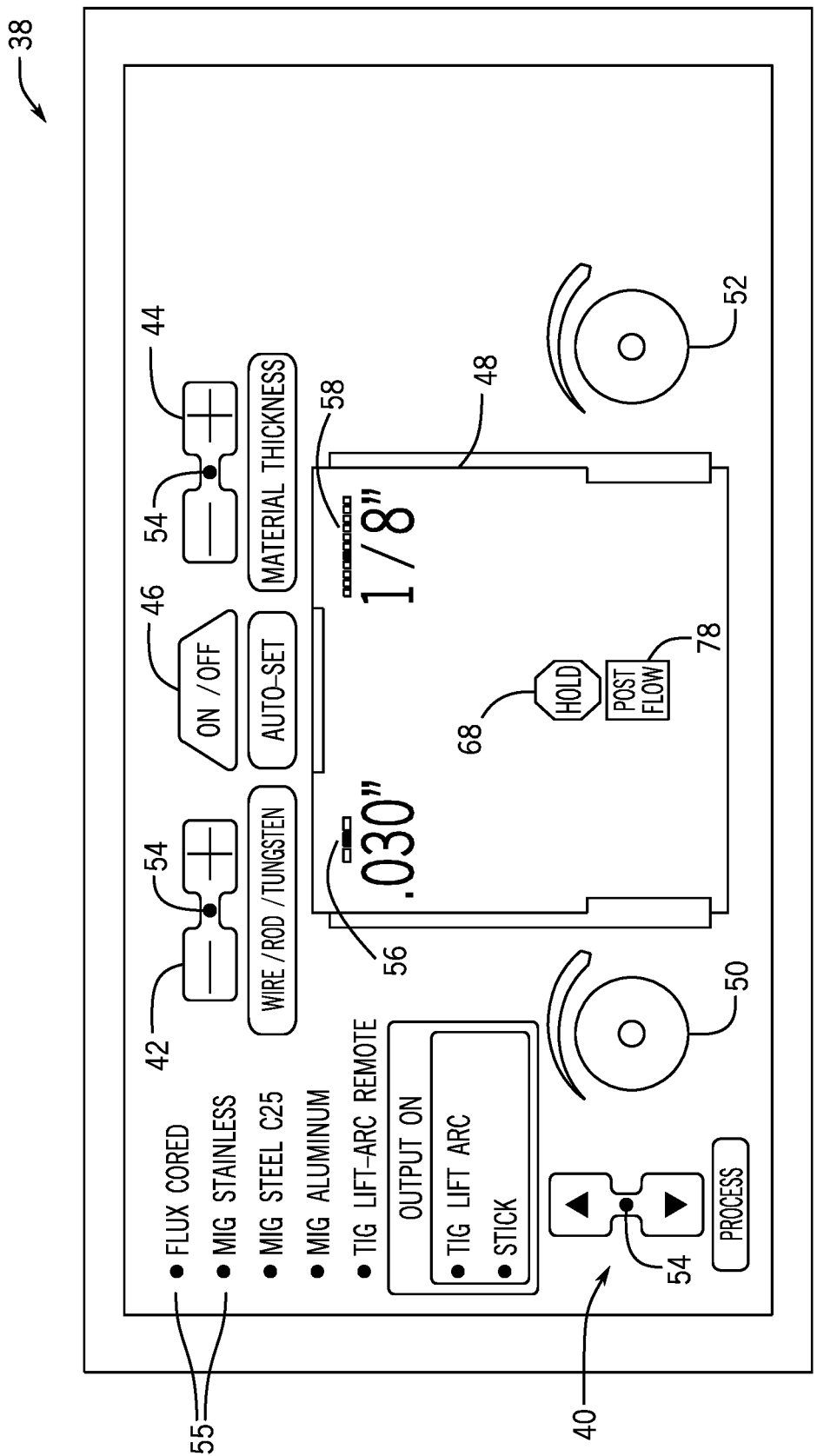
FIG. 19 is a front view of an embodiment of the interface for a TIG remote post-flow state including Auto-Set welding parameters and remote, post-flow, and output graphical indicators.

In certain embodiments, the TIG remote process may be selected via the welding process selector 40 of the user interface 38. As depicted within the color display screen 48 illustrated in FIG. 14, the TIG remote process may be indicated by a graphical indicator 82. In such a process, one or more welding parameters may be remotely controlled or adjusted by an operator. For example, FIG. 14 illustrates the TIG remote standby state, where ¹⁄₁₆" represents an entered value of electrode diameter, and ³⁄₁₆" represents an entered value of material thickness. The power source 16 may automatically set the appropriate setting of the amperage parameter (e.g., 140 amps). FIG. 15 illustrates the TIG remote weld state, in which the appropriate settings for welding voltage (e.g., 12.0 volts) and welding amperage (e.g., 140 amps) are automatically displayed while an operator or other user executes a weld. Similarly, FIG. 16 displays the TIG remote hold state, wherein, for example, after displaying the aforementioned weld state, the operating welding voltage and welding amperage parameters are further held for an additional duration, as indicated by the hold state indicator 68, such that the operator may note those preceding welding parameters. FIG. 17 depicts the TIG remote open circuit voltage (OCV) state, where the appropriate amperage (e.g., 140 amps) parameter setting is automatically set upon receiving the electrode diameter (e.g., 1/16") and material thickness (e.g., 3/16") inputs (e.g., via the electrode diameter adjustor 42 and the material thickness adjustor 44). The output graphical indicator 64 further signals that there is currently an output power from the power source 16, but that no welding arc is maintained. The TIG remote process may also include pre-flow and post-flow states, as depicted in FIGS. 18 and 19, respectively. The pre-flow state and post-flow state of the TIG remote process may perform the same functions and exhibit the same properties as that of the TIG pre-flow and post-flow states (e.g., as discussed above with respect to FIGS. 12 and 13).

The embodiments described herein provide an intuitive and flexible graphical user interface for setting welding parameters for various processes, material types, material thicknesses, gas types, and electrode diameters. The embodiments described herein provide a quick and simple means for setting welding parameters to a novice operator, or even an experienced operator, who may be unfamiliar with a certain welding process. The embodiments described herein further display color graphical representations of recommended welding parameter ranges of values, and display when the given welding parameters are at the appropriate or optimal settings. The graphical user interface is also configured to render additional instruction and guidance to the operator for a given selected welding process. The embodiments described herein also give the operator a simple means to enable or disable the Auto-Set function, such that the operator may take advantage of the automatic setting of welding parameters, or make use of the traditional manual setting of the welding parameters.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding system, comprising:
an interface, comprising:
a first input element configured to receive an input relating to a parameter of power delivered to a welding torch from a welding power supply;
a second input element configured to receive an input relating to a rate of advancement of an electrode delivered to the welding torch from a welding wire feeder;
a third input element configured to receive an input relating to whether the parameter of power and the rate of advancement of the electrode are automatically set; and
a color display device configured to display:
the parameter of power;
the rate of advancement of the electrode;
a plurality of discrete electrode diameter indicators displayed together as a range of selectable electrode diameters, and an indication of a selected one of the plurality of discrete electrode diameter indicators; and
a plurality of discrete material thickness indicators displayed together as a range of selectable material thicknesses, and an indication of a selected one of the plurality of discrete material thickness indicators; and control circuitry configured to adjust and display on the color display device the parameter of power and the rate of advancement based at least in part on a selected diameter setting for the electrode and a selected material thickness setting for a work piece when the third input element is activated, and to control the parameter of power and the rate of advancement based on the adjustment of the parameter of power and the rate of advancement.

2. The welding system of claim 1, wherein the color display device is configured to display a first color graphical representation of an acceptable range of values for the parameter of power, and to display a second color graphical representation of an acceptable range of values for the rate of advancement of the electrode, wherein the first color graphical representation comprises an indication of where the adjusted parameter of power value is relative to the acceptable range of values for the parameter of power, and the second color graphical representation comprises an indication of where the adjusted rate of advancement value is relative to the acceptable range of values for the rate of advancement.

3. The welding system of claim 2, wherein the control circuitry is configured to adjust and display on the color display device the first color graphical representation of the acceptable range of values for the parameter of power, and to adjust and display on the color display device the second color graphical representation of the acceptable range of values for the rate of advancement of the electrode.

4. The welding system of claim 2, wherein the control circuitry is configured to adjust a color of the first color graphical representation based on where the adjusted parameter of power value is relative to the acceptable range of values for the parameter of power, and to adjust a color of the second color graphical representation based on where the adjusted rate of advancement value is relative to the acceptable range of values for the rate of advancement.

5. welding system of claim 4, wherein the control circuitry is configured to adjust the parameter of power and the rate of advancement to values within their respective acceptable ranges of values when the third input element is activated.

6. The welding system of claim 2, wherein the control circuitry is configured to display on the color display device the first and second color graphical representations having sliders that change colors based on a respective current value in relation to the respective acceptable range of values.

7. The welding system of claim 2, wherein the interface comprises a fourth input element configured to receive an input relating to the diameter setting of the electrode, wherein the control circuitry is configured to determine the acceptable ranges of values based at least in part on the diameter setting of the electrode.

8. The welding system of claim 2, wherein the interface comprises a fourth input element configured to receive an input relating to the material thickness setting of the work piece, wherein the control circuitry is configured to determine the acceptable ranges of values based at least in part on the material thickness setting.

9. The welding system of claim 2, wherein the control circuitry is configured to display on the color display device the first color graphical representation of the acceptable range of values for the parameter of power for a predetermined amount of time after an input is received by the first input element, and to display on the color display device the second color graphical representation of the acceptable range of values for the rate of advancement of the electrode for the predetermined amount of time after an input is received by the second input element.

10. The welding system of claim 2, wherein the control circuitry is configured to only accept values from the first input element that correspond to values of the parameter of power that are within the acceptable range of values for the parameter of power.

11. The welding system of claim 2, wherein the control circuitry is configured to only accept values from the second input element that correspond to values of the rate of advancement of the electrode that are within the acceptable range of values for the rate of advancement of the electrode.

12. A welding system, comprising:
an interface, comprising:
a first input element configured to receive an input relating to a parameter of power delivered to a welding torch from a welding power supply;
a second input element configured to receive an input relating to a rate of advancement of an electrode delivered to the welding torch from a welding wire feeder;
a third input element configured to receive an input relating to whether the parameter of power and the rate of advancement of the electrode are automatically set; and
a color display device configured to display the parameter of power and the rate of advancement of the electrode, wherein the color display device is further configured to display one or more of the first input element, the second input element, or the third input element; and
control circuitry configured to adjust and display on the color display device the parameter of power and the rate of advancement based at least in part on a selected diameter setting for the electrode displayed along a range of selectable electrode diameters displayed on the color display device, and a selected material thickness displayed along a range of selectable material thicknesses displayed on the color display device, setting for a work piece when the third input element is activated, and to control the parameter of power and the rate of advancement based on the adjustment of the parameter of power and the rate of advancement wherein the first input element, the second input element, the third input element, or some combination thereof, are displayed as graphical input elements on the color display device.

13. A welding system, comprising:
an interface, comprising:
a first input element configured to receive an input relating to a parameter of power delivered to a welding torch from a welding power supply;
a second input element configured to receive an input relating to a rate of advancement of an electrode delivered to the welding torch from a welding wire feeder;
a third input element configured to receive an input relating to whether the parameter of power and the rate of advancement of the electrode are automatically set; and
a color display device configured to display:
a first color graphical representation of an acceptable range of values for the parameter of power;
a second color graphical representation of an acceptable range of values for the rate of advancement of the electrode;
a plurality of discrete electrode diameter indicators displayed simultaneously, and an indication of a selected one of the plurality of discrete electrode diameter indicators; and
a plurality of discrete material thickness indicators displayed simultaneously, and an indication of a selected one of the plurality of discrete material thickness indicators; and
control circuitry configured to adjust and display on the color display device the first color graphical representation of the acceptable range of values for the parameter of power when the third input element is activated, to adjust and display on the color display device the second color graphical representation of the acceptable range of values for the rate of advancement of the electrode when the third input element is activated, and to control the parameter of power and the rate of advancement based on the adjustment.

14. The welding system of claim 13, wherein the first color graphical representation comprises an indication of where the adjusted parameter of power value is relative to the acceptable range of values for the parameter of power, and the second color graphical representation comprises an indication of where the adjusted rate of advancement value is relative to the acceptable range of values for the rate of advancement.

15. The welding system of claim 13, wherein the control circuitry is configured to adjust a color of the first color graphical representation based on where the adjusted parameter of power value is relative to the acceptable range of values for the parameter of power, and to adjust a color of the second color graphical representation based on where the adjusted rate of advancement value is relative to the acceptable range of values for the rate of advancement.

16. The welding system of claim 15, wherein the control circuitry is configured to adjust the parameter of power and the rate of advancement to values within their respective acceptable ranges of values when the third input element is activated.

17. The welding system of claim 13, wherein the control circuitry is configured to display on the color display device the first and second color graphical representations having sliders that change colors based on a respective current value in relation to the respective acceptable range of values.

18. The welding system of claim 13, wherein the interface comprises a fourth input element configured to receive an input relating to a diameter of the electrode, wherein the control circuitry is configured to determine the acceptable ranges of values based at least in part on the diameter of the electrode.

19. The welding system of claim 13, wherein the interface comprises a fourth input element configured to receive an input relating to a material thickness of a work piece, wherein the control circuitry is configured to determine the acceptable ranges of values based at least in part on the material thickness.

20. The welding system of claim 13, wherein the control circuitry is configured to display on the color display device the first color graphical representation of the acceptable range of values for the parameter of power for a predetermined amount of time after an input is received by the first input element, and to display on the color display device the second color graphical representation of the acceptable range of values for the rate of advancement of the electrode for the predetermined amount of time after an input is received by the second input element.

21. The welding system of claim 13, wherein the control circuitry is configured to only accept values from the first input element that correspond to values of the parameter of power that are within the acceptable range of values for the parameter of power.

22. The welding system of claim 13, wherein the control circuitry is configured to only accept values from the second input element that correspond to values of the rate of advancement of the electrode that are within the acceptable range of values for the rate of advancement of the electrode.

23. The welding system of claim 13, wherein the first input element, the second input element, the third input element, or some combination thereof, are displayed as graphical input elements on the color display device.

24. The welding system of claim 1, wherein the range of selectable electrode diameters is displayed as a first set of discrete points along a first segmented line, and the range of selectable material thicknesses is displayed as a second set of discrete points along a second segmented line.

* * * * *